(12) United States Patent
Ramasubramonian et al.

(10) Patent No.: US 10,536,695 B2
(45) Date of Patent: Jan. 14, 2020

(54) COLOUR REMAPPING INFORMATION SUPPLEMENTAL ENHANCEMENT INFORMATION MESSAGE PROCESSING

(71) Applicant: QUALCOMM Incorporated, San Diego, CA (US)

(72) Inventors: Adarsh Krishnan Ramasubramonian, San Diego, CA (US); Dmytro Rusanovskyy, San Diego, CA (US); Sungwon Lee, San Diego, CA (US); Joel Sole Rojals, San Diego, CA (US); Done Bugdayci Sansli, La Jolla, CA (US); Marta Karczewicz, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 152 days.

(21) Appl. No.: 15/260,148

(22) Filed: Sep. 8, 2016

(65) Prior Publication Data
US 2017/0070735 A1 Mar. 9, 2017

Related U.S. Application Data

(60) Provisional application No. 62/216,254, filed on Sep. 9, 2015.

(51) Int. Cl.
*H04N 19/186* (2014.01)
*H04N 19/124* (2014.01)

(52) U.S. Cl.
CPC ......... *H04N 19/124* (2014.11); *H04N 19/186* (2014.11)

(58) Field of Classification Search
CPC .................. H04N 21/44029; H04N 19/124
USPC .................................................. 375/240.25
See application file for complete search history.

(56) References Cited

U.S. PATENT DOCUMENTS

| 9,521,393 B2 | 12/2016 | Wang et al. |
| 2010/0049865 A1 | 2/2010 | Hannuksela et al. |
| 2014/0192149 A1 | 7/2014 | Wang et al. |
| 2018/0077453 A1* | 3/2018 | Oh ................... H04N 21/44029 |
| 2018/0242006 A1* | 8/2018 | Kerofsky ............... H04N 19/70 |

OTHER PUBLICATIONS

International Search Report and Written Opinion—PCT/US2016/050941—ISA/EPO—dated Mar. 17, 2017, 21 pp.
(Continued)

*Primary Examiner* — Albert Kir
(74) *Attorney, Agent, or Firm* — Shumaker & Sieffert, P.A.

(57) ABSTRACT

In an example, a method of processing video may include receiving a bitstream including encoded video data and a colour remapping information (CRI) supplemental enhancement information (SEI) message. The CRI SEI message may include information corresponding to one or more colour remapping processes. The method may include decoding the encoded video data to generate decoded video data. The method may include applying a process that does not correspond to the CRI SEI message to the decoded video data before applying at least one of the one or more colour remapping processes to the decoded video data to produce processed decoded video data.

12 Claims, 15 Drawing Sheets

(56) References Cited

OTHER PUBLICATIONS

Ramasubramonian A.K., et al., "Clarifications on the semantics of CRI SEI message and its usage for HDR/WCG video compression," 22, JCT-VC Meeting; Oct. 15, 2015 Oct. 21, 2015; Geneva, CH; (Joint Collaborative Team on Video Coding of ISO/IEC JTC1/SC29/WG11 and ITU-T SG.16 ); URL: http://wftp3.itu.int/av-arch/jctvc-site/,, No. JCTVC-V0064, Oct. 6, 2015 (Oct. 6, 2015), XP030117718, 3 pp.

Response to Invitation to Pay Additional Fees dated Nov. 22, 2016, from International Application No. PCT/US2016/050941, filed on Dec. 21, 2016, 4 pp.

Andrivon P., et al., "Colour Remapping Information SEI Message for AVC," International Organisation for Standardisation, ISO/IEC JTC1/SC29/WG11, MPEG 2015, No. M36521, Jul. 2015, XP030064889, 11 pages.

Partial International Search Report for International Application No. PCT/US2016/050941, dated Nov. 22, 2016, 7 pp.

Ramasubramonian A.K., et al., "Clarifications on the Semantics of CRI SEI Message and its Usage for HDR/WCG Video Compression," 22 JCT-VC Meeting; Oct. 15 through 21, 2015; Geneva, CL; (Joint Collaborative Team on Video Coding of ISO/IEC JTC1/SC29/WG11 and ITU-T SG.16 ); URL: http://wftp3.itu.int/av-arch/jctvc-site/, No. JCTVC-V0064, Oct. 6, 2015, XP030117718, 3 pp.

ITU-T H.265, Series H: Audiovisual and Multimedia Systems, Infrastructure of audiovisual services—Coding of moving video, Advanced video coding for generic audiovisual services, The International Telecommunication Union, Apr. 2015, 634 pp.

ETSI TS 101 547-2, V1.2.1,Technical Specification, "Digital Video Broadcasting (DVB); Plano-stereoscopic 3dTV; Part 2: Frame Compatible Plano-stereoscopic 3DTV," Nov. 2012, 26 pp.

3GPP TS 26.114, V13.1.0, Technical Specification, "3rd Generation Partnership Project; Technical Specification Group Services and System Aspects; IP Multimedia Subsystem (IMS); Multimedia Telephony; Media handling and interaction (Release 13)," Sep. 2015, 327 pp.

ETSI, ETS TS 101 154, V1.9.1, Technical Specification, "Digital Video Broadcasting(DVB); Specification for use of Video and Audio Coding in Broadcasting Applications based on MPEG-2 Transport Stream," Sep. 2009, 163 pp.

International Preliminary Report on Patentability from International Application No. PCT/US2016/050941, dated Mar. 22, 2018, 12 pp.

\* cited by examiner

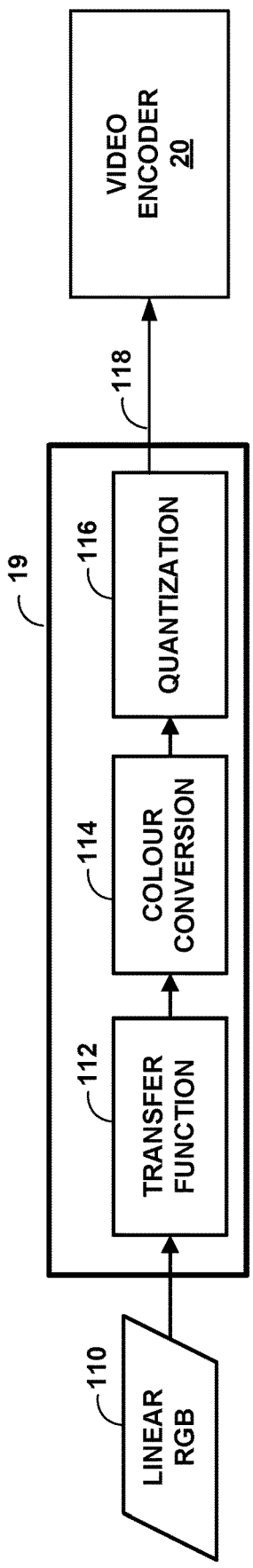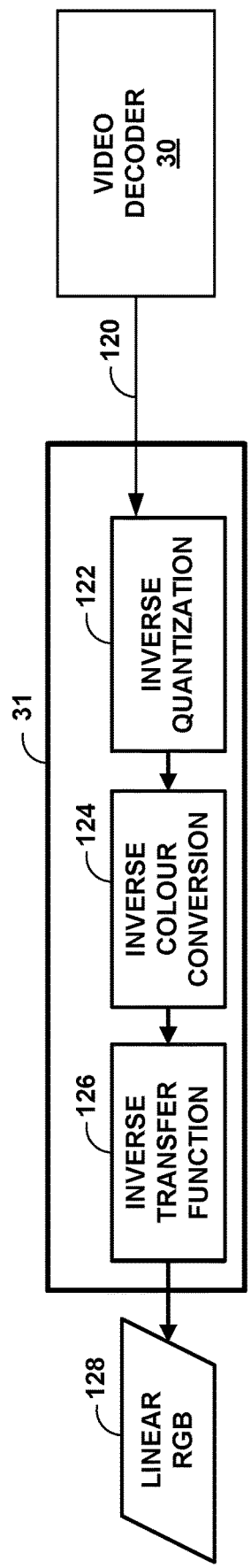

Example of EOTFs

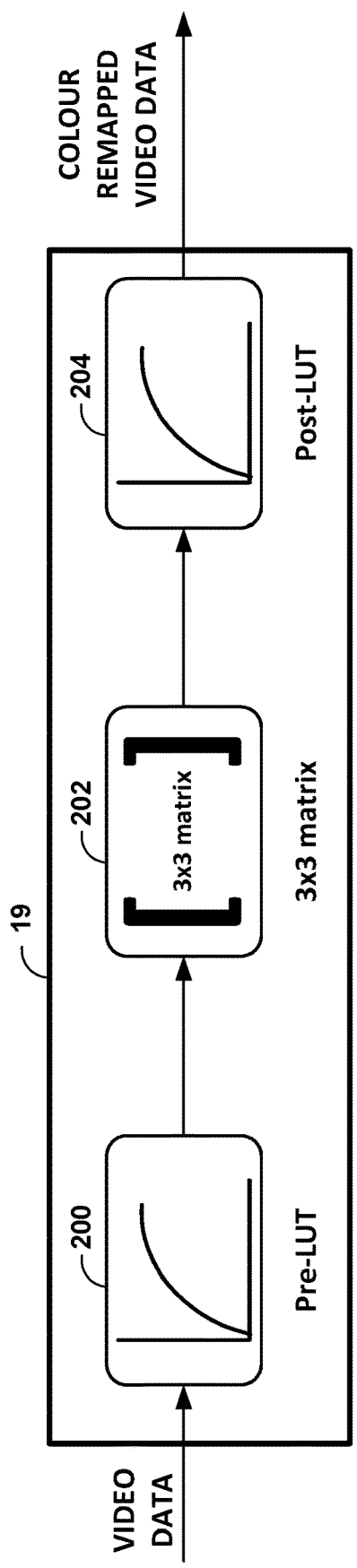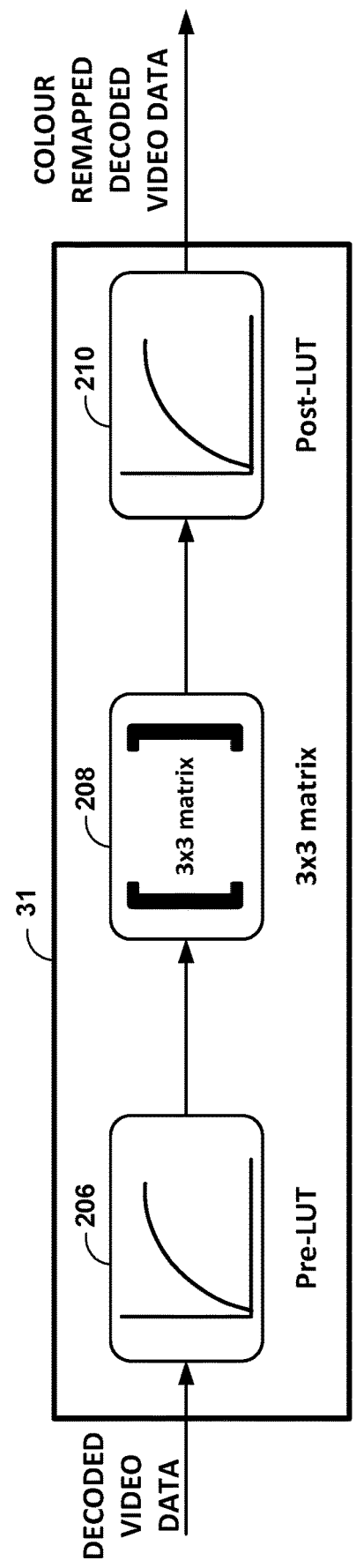

COLOUR REMAPPING INFORMATION SUPPLEMENTAL ENHANCEMENT INFORMATION MESSAGE PROCESSING

This application claims the benefit of U.S. Provisional Application No. 62/216,254 filed on Sep. 9, 2015, the entire content of which is incorporated by reference herein.

TECHNICAL FIELD

This disclosure relates to processing video data.

BACKGROUND

Digital video capabilities can be incorporated into a wide range of devices. Digital video devices may implement video coding techniques, such as those described in the video coding standards defined by MPEG-2, MPEG-4, ITU-T H.263, ITU-T H.264/MPEG-4, Part 10, Advanced Video Coding (AVC), ITU-T H.265, High Efficiency Video Coding (HEVC), and extensions of such standards. Digital video devices may be configured to capture, transmit, receive, encode, decode, and/or store digital video information. Digital video devices may be configured to capture, transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. As an example, for block-based video coding, a video slice (e.g., a video frame or a portion of a video frame) may be used. A video slice may be partitioned into video blocks, which may also be referred to as treeblocks, coding units (CUs), and/or coding nodes. Video blocks in an intra-coded (I) slice of a picture are encoded using spatial prediction with respect to reference samples in reference blocks (e.g., neighboring blocks) in the same picture. Video blocks in an inter-coded (P or B) slice of a picture may use spatial prediction with respect to reference samples in reference (e.g., neighboring) blocks in the same picture or temporal prediction with respect to reference samples in other reference pictures. Pictures may be referred to as frames, and reference pictures may be referred to as reference frames.

SUMMARY

This disclosure relates to processing video data, including processing video data in accordance with one or more CRI SEI messages.

In one example, this disclosure describes a method comprising receiving a bitstream including encoded video data and a colour remapping information (CRI) supplemental enhancement information (SEI) message, wherein the CRI SEI message includes information corresponding to one or more colour remapping processes; decoding the encoded video data to generate decoded video data; and applying a process that does not correspond to the CRI SEI message to the decoded video data before applying at least one of the one or more colour remapping processes to the decoded video data to produce processed decoded video data.

In another example, this disclosure describes a device comprising a memory; and one or more processors configured to: process a bitstream including encoded video data and a colour remapping information (CRI) supplemental enhancement information (SEI) message, wherein the CRI SEI message includes information corresponding to one or more colour remapping processes; decode the encoded video data to generate decoded video data; store the decoded video data in the memory; and apply a process that does not correspond to the CRI SEI message to the decoded video data before applying at least one of the one or more colour remapping processes to the decoded video data to produce processed decoded video data.

In another example, this disclosure describes an apparatus comprising means for receiving a bitstream including encoded video data and a colour remapping information (CRI) supplemental enhancement information (SEI) message, wherein the CRI SEI message includes information corresponding to one or more colour remapping processes; means for decoding the encoded video data to generate decoded video data; and means for applying a process that does not correspond to the CRI SEI message to the decoded video data before applying at least one of the one or more colour remapping processes to the decoded video data to produce processed decoded video data.

In another example, this disclosure describes a non-transitory computer-readable storage medium having instructions stored thereon that, when executed, cause one or more processors to: process a bitstream including encoded video data and a colour remapping information (CRI) supplemental enhancement information (SEI) message, wherein the CRI SEI message includes information corresponding to one or more colour remapping processes; decode the encoded video data to generate decoded video data; and apply a process that does not correspond to the CRI SEI message to the decoded video data before applying at least one of the one or more colour remapping processes to the decoded video data to produce processed decoded video data.

In another example, this disclosure describes a method comprising receiving a bitstream including encoded video data and a plurality of colour remapping information (CRI) supplemental enhancement information (SEI) messages, wherein each CRI SEI message of the plurality of CRI SEI messages includes information corresponding to one or more colour remapping processes, wherein the plurality of CRI SEI messages include a first CRI SEI message and a second CRI SEI message; and decoding the encoded video data to generate decoded video data, wherein plurality of CRI SEI messages correspond to the same decoded video data.

In another example, this disclosure describes a method comprising receiving a bitstream including encoded video data and a colour remapping information (CRI) supplemental enhancement information (SEI) message, wherein the CRI SEI message includes information corresponding to one or more colour remapping processes and a value corresponding to a syntax element; and decoding the encoded video data to generate decoded video data, wherein the value corresponding to the syntax element is indicative of: whether the decoded video data, with or without additional processing, is compatible for presentment by a Standard Dynamic Range (SDR) display or a High Dynamic Range (HDR) display, whether the one or more colour remapping processes corresponding to the CRI SEI message are configured such that an input and an output respectively corresponding to each colour remapping process of the one or more colour remapping processes are equal, or whether a process that does not correspond to the CRI SEI message is to be applied between two colour remapping processes corresponding to the CRI SEI message.

The details of one or more examples are set forth in the accompanying drawings and the description below. Other features, objects, and advantages will be apparent from the description, drawings, and claims.

BRIEF DESCRIPTION OF DRAWINGS

FIG. 4 is a conceptual diagram showing a HDR/WCG representation conversion.

FIG. 5 is a conceptual diagram showing an HDR/WCG inverse conversion.

FIG. 7 is a conceptual diagram showing an example structure of a colour remapping process.

FIG. 8 is a conceptual diagram showing an example structure of a colour remapping process.

DETAILED DESCRIPTION

Figure 1:
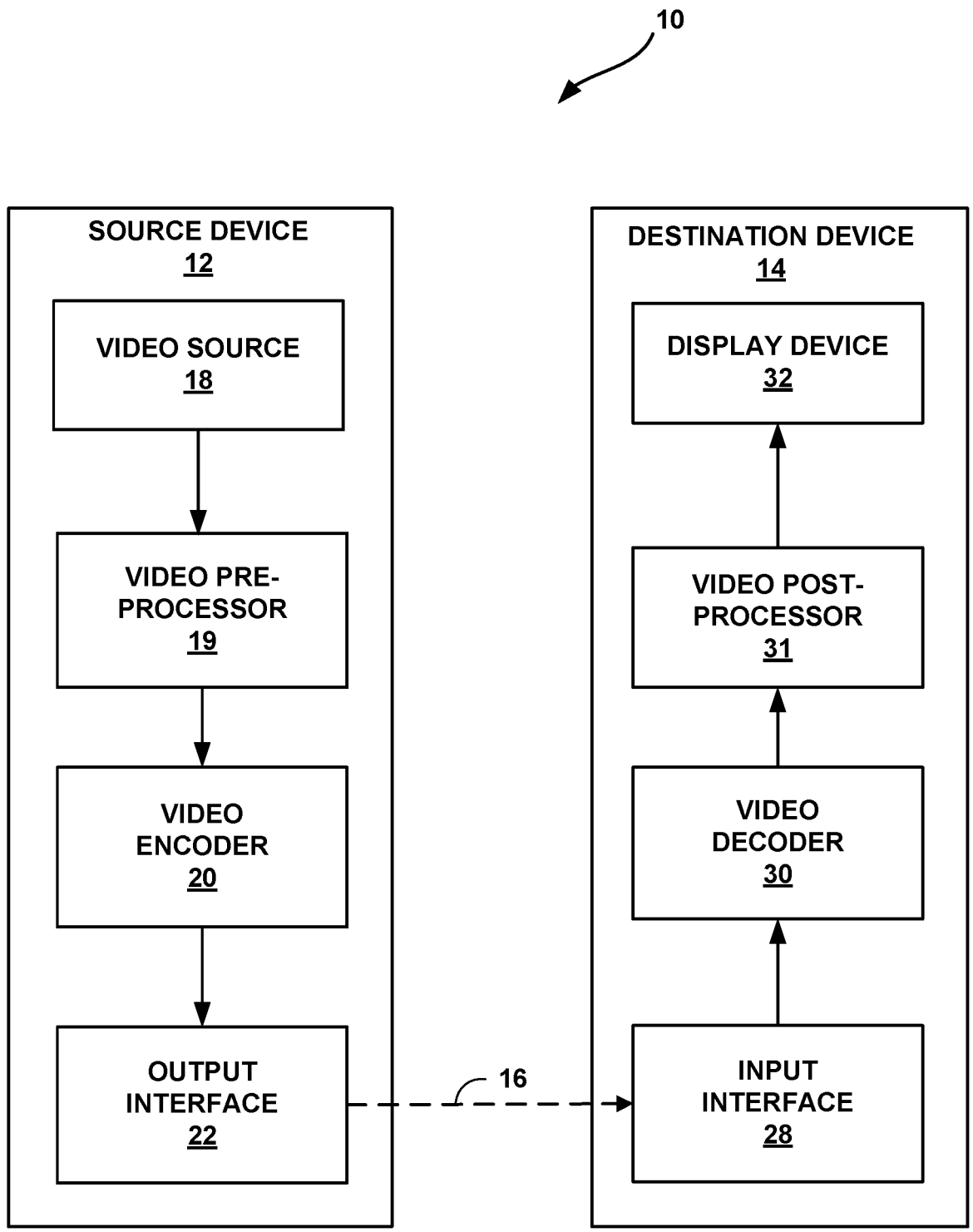
FIG. 1 is a block diagram illustrating an example video encoding and decoding system configured to implement the techniques of the disclosure.

Video coding techniques may include use of supplemental enhancement information (SEI) messages. For example, a video encoder may signal SEI messages in a bitstream, and a video decoder may receive a bitstream containing SEI messages. There are various types of SEI messages in various video coding standards. An SEI message that includes colour remapping information may be referred to as a colour remapping information SEI message, or more simply, a CRI SEI message. A CRI SEI message may be signaled in a bitstream by a video encoder. Similarly, a video decoder may receive a CRI SEI message in a bitstream.

This disclosure is related to the field of video data processing, including, for example, the coding of video signals with, for example, High Dynamic Range (HDR) and/or Wide Colour Gamut (WCG) representations. For example, the techniques of this disclosure include several methods to improve the application of the CRI SEI message specified in the H.265/HEVC video coding standard. The HEVC standard is published as ITU-T H.265, Series H: Audiovisual and Multimedia Systems, Infrastructure of audiovisual services—Coding of moving video, High Efficiency Video Coding, the International Telecommunication Union, April 2015 (hereinafter "HEVC" or "the HEVC standard"). As another example, this disclosure describes several improvements, such as signaling efficiency improvements relating to the CRI SEI message, enabling more applications of the CRI SEI message, and improving the semantics for the CRI SEI message. In some examples, the techniques described herein may improve the usage of the CRI SEI message for certain video content, such as HDR/WCG content. In some examples, the techniques described herein may improve or enable the utilization of the CRI SEI with earlier video coding standards, such as H.264/AVC and others. Otherwise stated, while one or more examples described herein may be described relative to an example video coding standard (e.g., HEVC), it is understood that such examples are described relative to the example video coding standard out of convenience, meaning that any techniques described herein may apply to any video coding standard despite being described relative to an example video coding standard (e.g., HEVC).

Video coding standards, including hybrid-based video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC) including its extensions (e.g., the Scalable Video Coding (SVC) and Multi-view Video Coding (MVC) extensions), and HEVC including its extensions (e.g., the range and screen content coding extensions).

As used herein, instances of the term "video" may be changed to the term "content," and instances of the term "content" may be changed to the term "video." This is true regardless of whether the terms "content" or "video" are being used as an adjective, noun, or other part of speech. For example, reference to a "video coder" also includes reference to a "content coder," and reference to a "content coder" also includes reference to a "video coder." As another example, reference to a "video encoder" also includes reference to a "content encoder," and reference to a "content encoder" also includes reference to a "video encoder." As another example, reference to a "video decoder" also includes reference to a "content decoder," and reference to a "content decoder" also includes reference to a "video decoder." As another example, reference to "video" also includes reference to "content," and reference to "content" also includes reference to "video." As another example, reference to "video data" also includes reference to "content data," and reference to "content data" also includes reference to "video data."

As used herein, "content" refers to any type of content. For example, "content" may refer to video, screen content, image, any graphical content, any displayable content, or any data corresponding thereto (e.g., video data, screen content data, image data, graphical content data, displayable content data, and the like).

As used herein, the term "video" may refer to screen content, movable content, a plurality of images (e.g., pictures) that may be presented in a sequence, or any data corresponding thereto (e.g., screen content data, movable content data, video data, image data, and the like).

As used herein, the term "image" may refer to a single image, one or more images, one or more images amongst a plurality of images corresponding to a video, one or more images amongst a plurality of images not corresponding to a video, a plurality of images corresponding to a video (e.g., all of the images corresponding to the video or less than all of the images corresponding to the video), a sub-part of a single image, a plurality of sub-parts of a single image, a plurality of sub-parts corresponding to a plurality of images, one or more graphics primitives, image data, graphical data, and the like.

As used herein, the terms "component," "colour component," "channel," and/or "colour channel" may be used interchangeably. For example, "colour component" includes reference to "colour channel," and reference to "colour channel" includes reference to "colour component."

As used herein, the terms "pixel value," "component value," and "colour component value" may be used interchangeably. As one example, reference to mapping input pixel values to output pixel values also refers to mapping input component values to output component values. As another example, reference to mapping input pixel values to output pixel values also refers to mapping input colour component values to output colour component values.

FIG. 1 is a block diagram illustrating an example video encoding and decoding system 10 that may utilize techniques of this disclosure. As shown in FIG. 1, system 10 includes a source device 12 and a destination device 14. Source device 12 and destination device 14 may comprise any of a wide range of devices, including, for example, any computing device (e.g., notebook computers, desktop computers, laptop computers, tablet computers, personal computing devices, such as Personal Data Assistants (PDAs), phones (e.g., smart phones), smart pads, digital televisions, digital cameras (e.g., video cameras), display devices, digital media players, video gaming consoles, video game devices (e.g., handheld gaming devices), video streaming devices, digital direct broadcast systems, wireless broadcast systems, wired broadcast systems, e-book readers, any device configured to perform video encoding, any device configured to perform video decoding, or the like). In some cases, source device 12 and destination device 14 may be equipped for wireless and/or wired communication.

Source device 12 may be configured to generate and/or output encoded video data. The encoded video data may be included in a sequence of bits that may be referred to as a bitstream. Source device 12 may be configured to provide encoded video data to destination device 14. Destination device 14 may be configured to decode encoded video data, whether received from another device (e.g., source device 12) or generated by destination device 14. In some examples, source device 12 may be configured to provide (e.g., send or otherwise transmit) encoded video data to destination device 14 via a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Video source 18 of source device 12 may include a video capture device, such as a video camera, a video feed interface to receive video from a video content provider, and/or a memory having stored thereon video data (e.g., a video archive containing previously captured video). As another example, video source 18 may generate computer graphics-based data as the source video, or a combination of live video, archived video, and computer-generated video. In some examples, if video source 18 is a video camera, source device 12 and destination device 14 may be any computing device configured with a camera (e.g., a camera, a phone such as a smart phone, camera phone, or any other name for phone configured with a camera). As mentioned herein, the captured, pre-captured, or computer-generated video data may be encoded by video encoder 20 after being processed by video pre-processor 19. The encoded video data may then be output by output interface 22 onto a computer-readable medium 16. Input interface 28 of destination device 14 may receive information (e.g., encoded video data in the form of a bitstream) from source device 12 via computer-readable medium 16. The information of computer-readable medium 16 may include syntax information defined by video encoder 20, which may be used by video decoder 30 to decode encoded video data.

Destination device 14 may be configured to receive encoded video data from source device 12 via computer-readable medium 16. Computer-readable medium 16 may comprise any type of medium or device capable of moving encoded video data from source device 12 to destination device 14. In one example, computer-readable medium 16 may comprise a communication medium to enable source device 12 to transmit encoded video data directly to destination device 14 in real-time. In some examples, the encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be used to facilitate communication from source device 12 to destination device 14.

In some examples, encoded data may be output from output interface 22 of source device 12 to a storage device. Similarly, encoded data may be accessed from the storage device by an input interface 28 of destination device 14. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In some examples, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

The examples described herein are non-limiting examples. For example, the illustrated system 10 of FIG. 1 is merely one example. Techniques for processing video data in accordance with this disclosure may be performed by any video encoding device, any video decoding device, any video coding device, any video encoding system, any video decoding system, and/or any video coding system. As used herein "coding" may refer to encoding and/or decoding. Similarly, as used herein, "coder" may refer to an encoder and/or decoder. For example, a video coder may refer to a video encoder and/or a video decoder. Likewise, video coding may refer to video encoding and/or video decoding, as applicable. As another example, reference to a video coding system may refer to a video encoding system, a video decoding system, or a video encoding/decoding system (i.e., a video coding system is a system configured to perform both video encoding and video decoding).

In the example of FIG. 1, source device 12 includes video source 18, video pre-processor 19, video encoder 20, and output interface 22. Video pre-processor 19, video encoder 20, and/or output interface 22 may be configured to implement one or more techniques of this disclosure. In the example of FIG. 1, destination device 14 includes input interface 28, video decoder 30, video post-processor 31, and display device 32. Display device 32 may be configured to display decoded video data (e.g., decoded video data processed by video post-processor 31). Display device 32 may comprise any of a variety of display devices such as a cathode ray tube (CRT), a liquid crystal display (LCD), a plasma display, an organic light emitting diode (OLED) display, or any other type of display device.

Input interface 28, video decoder 30, and/or video post-processor 31 may be configured to implement one or more techniques of this disclosure. In some examples, video pre-processor 19 may be separate from video encoder 20. In other examples, video pre-processor 19 may be part of video encoder 20. Similarly, in some examples, video post-processor 31 may be separate from video decoder 30. In other examples, video post-processor 31 may be part of video decoder 30.

In other examples of system 10, source device 12 and destination device 14 may include other components or arrangements. For example, source device 12 may receive video data from an external video source 18, such as an external camera. In such an example, output interface 22 may be more appropriately referred to as communication interface 22 since it may be configured to receive and/or transmit data in other examples. Likewise, destination device 14 may interface with an external display device, rather than including an integrated display device. As another example, destination device 14 may transmit video data to source device 12. In such an example, input interface 28 may be more appropriately referred to as communication interface 28 since it may be configured to receive and/or transmit data in other examples.

As another example, a device configured to perform one or more techniques described herein, any computing device (e.g., source device 12 and/or destination device 14) may include a video encoder (e.g., video encoder 20) and a video decoder (e.g., video decoder 30), video pre-processor (e.g., video pre-processor 19) and video post-processor 31 (e.g., video post-processor 31), and a communication interface (e.g., output interface 22 and/or input interface 28). In such an example, the computing device may be configured to perform one or more techniques described herein. Also in such an example, the video encoder and video decoder may be separate components or may be part of a single component (e.g., a video coder configured to perform both encoding and decoding). Similarly, the video pre-processor and video post-processor may be separate components or may be part of a single component. In another example, the video pre-processor and/or video post-processor may be part of the video coder.

It is therefore understood that reference to a process performed on video data by video pre-processor 19 may refer to a process performed on the video data by video encoder 20 before video encoder 20 encodes the video data in accordance with, for example, a video coding standard. Similarly, reference to video pre-processor 19 may, in some examples, be interchangeable with video encoder 20. Likewise, reference to video encoder 20 may, in some examples, be interchangeable with video pre-processor 19.

It is also understood that reference to a process performed on (or applied to) video data by video post-processor 31 may refer to a process performed on (or applied to) the video data by video decoder 30 after video decoder 30 has decoded the video data. Similarly, reference to video post-processor 31 may, in some examples, be interchangeable with video decoder 30. Likewise, reference to video decoder 30 may, in some examples, be interchangeable with video post-processor 31.

As illustrated, video pre-processor 19 may be configured to receive video data from video source 18. In some examples, video pre-processor 19 may be configured to process received video data to convert it into a form that is suitable for encoding with video encoder 20. For example, video pre-processor 19 may be configured to perform dynamic range compacting (e.g., using a non-linear transfer function), colour conversion to a more compact or robust colour space, and/or floating-to-integer representation conversion.

Video pre-processor 19 may be configured to process video data before encoding the video data with video encoder 20. In some examples, video pre-processor 19 may be configured to perform colour remapping processing on video data before encoding the video with video encoder 20. For example, video pre-processor 19 may be configured to receive video data in a first colour space (e.g., RGB) and convert the received video data from the first colour space (e.g., RGB) to a second colour space (e.g., YCbCr). In such an example, video pre-processor 19 may be described as performing colour space conversion, which is one example of colour remapping processing.

Other examples of colour remapping processing may include conversion of High Dynamic Range (HDR) video data to Standard Dynamic Range (SDR) video data, conversion of SDR video data to HDR video data, any processing that enables easier and/or more efficient coding of the processed (e.g., converted) video data, any processing that converts video data into a format that is more suitable for coding and/or post-processing. As an example, video pre-processor 19 may be configured to receive HDR video data and convert the HDR video data to SDR video data. As another example, video pre-processor 19 may be configured to receive SDR video data and convert the SDR video data to HDR video data. As another example, video pre-processor 19 may be configured to receive video data, and process the received video data such that the processed video data may be encoded in an easier and/or more efficient manner. As another example, video pre-processor 19 may be configured to receive video data, and process the received video data into a format that is more suitable for coding and/or post-processing.

Other examples of colour remapping processing may include scaling the individual channels of video data (e.g., using a piecewise linear function), and the processed video data (which may be referred to as mapped or remapped content) may be encoded. For example, video pre-processor 19 may be configured to receive video data, and scale one or more channels of the received video data. Video encoder 20 may be configured to encode the scaled video data, which may also be referred to as mapped or remapped content. In yet other examples, the colour remapping processing may include converting the representation of the video data by, for example, changing the primaries of representation of the components (e.g., processing video data represented using one set of primaries, such as those defined by BT.709, into video data represented using another set of primaries, such as those defined by BT.2020). It is understood that video pre-processor 19 may be configured to perform any colour remapping process and that additional examples also exist. For example, colour volume transformation and display adaptation are two other examples of colour remapping processes. Similarly, it is understood that video post-processor 31 may be configured to perform any colour remapping process or any inverse (e.g., reciprocal) colour remapping process (e.g., the inverse of any colour remapping process performed by video pre-processor 19). Any colour remapping process performed by video post-processor 31 may or may not be reciprocal to a colour remapping process performed by video pre-processor 19. For example, video pre-processor 19 may be configured to perform one or more colour remapping processes on video data to enable, for example, more efficient encoding of the remapped video data by video encoder 20, whereas video post-processor 31 may be configured to perform one or more colour remapping processes on video data decoded by video decoder 30 to, for example, perform one or more colour remapping processes (e.g., colour volume transformation and/or scaling) adapt the decoded video data for display (e.g., adapt the decoded video data for better displayability for a particular display and/or display scenario).

Video pre-processor 19 may be configured to generate pre-processed video data (which may be referred to as colour remapped video data) and output the pre-processed video data to video encoder 20. Video encoder 20 may be configured to receive pre-processed video data from video pre-processor 19, and may be configured to perform video encoding on the pre-processed video data (i.e., perform video encoding after the video pre-processor 19 pre-processes the video data). In the colour space conversion example above, video encoder 20 may receive video data (e.g., a picture of a sequence of pictures) for encoding in a second colour space after the video pre-processor 19 has converted the video data from a first colour space.

Video post-processor 31 may be configured to process video data after the video data has been decoded with video decoder 30. For example, video decoder 30 may receive encoded video data, which video decoder 30 may then decode into decoded video data (e.g., a picture of a video sequence). Video decoder 30 may transmit the decoded video data to video post-processor 31 to process the decoded video data.

In some examples, video post-processor 31 may be configured to apply at least one colour remapping process directly to the decoded video data. In such examples, it is understood that video post-processor 31 may be configured to generated CRI processed decoded video data by performing at least one colour remapping process to the decoded video data. In other examples, video post-processor 31 may be configured to apply a process on decoded video data that does not correspond to a CRI SEI message before applying at least one colour remapping process to the decoded video data. In such examples, it is understood that video post-processor 31 may be configured to generate non-CRI processed decoded video data by performing a process on the decoded video data that does not correspond to a CRI SEI message, and then video post-processor 31 may be configured to generated CRI processed decoded video data by performing at least one colour remapping process to the non-CM processed decoded video data.

In some examples, video post-processor 31 may be configured to perform colour remapping processing on decoded video data. For example, video post-processor 31 may be configured to receive decoded video data from video decoder 30 in a first colour space (e.g., YCbCr) and convert the decoded video data from the first colour space (e.g., YCbCr) to a second colour space (e.g., RGB). In such an example, video post-processor 31 may be described as performing colour space conversion, which is one example of colour remapping processing. Video post-processor 31 may be configured to generate post-processed video data (which may be referred to as inverse colour remapped video data) and output the post-processed video data to another component, such as display device 32.

In some examples, video post-processor 31 may be configured to perform the process(es) that are reciprocal to the process(es) performed by video pre-processor 19. For example, if video pre-processor 19 performs a colour remapping process on video data, then video post-processor 31 may be configured to, in some examples, perform the inverse (i.e., reciprocal) of the colour remapping process (or more simply, the inverse colour remapping process) on decoded video data, provided that the information corresponding to one or more CRI SEI messages is received by video post-processor 31 that video post-processor 31 uses to determine whether reciprocal colour remapping is to be performed. As one example, if video pre-processor 19 performs colour space conversion on video data to convert the video data from a first colour space (e.g., RGB) to a second colour space (e.g., YCbCr), then video post-processor 31 may be configured to perform the inverse colour space conversion on the corresponding decoded video data to convert the decoded video data from the second colour space (e.g., YCbCr) to the first colour space (e.g., RGB). As another example, if video pre-processor 19 performs colour space conversion on video data to convert the video data from a first colour space (e.g., RGB) to a second colour space (e.g., YCbCr), then video post-processor 31 may be configured to perform a colour space conversion on the corresponding decoded video data to convert the decoded video data from the second colour space (e.g., YCbCr) to a third colour space different from RGB. As another example, if video pre-processor 19 performs colour space conversion on video data to convert the video data from a first colour space (e.g., RGB) to a second colour space (e.g., YCbCr), then video post-processor 31 may be configured to not perform a colour space conversion on the corresponding decoded video data, such that the decoded video data stays in the second colour space (e.g., YCbCr).

In other examples, video post-processor 31 may be configured to perform one or more processes that are not reciprocal to any process performed by video pre-processor 19. For example, if video pre-processor 19 performs a colour remapping process on video data, then video post-processor 31 may be configured to, in some examples, perform one or more colour remapping processes on decoded video data that may be the same or different to the colour remapping process performed on the video data by video pre-processor 19. It is therefore understood that video post-processor 31 may be configured to perform one or more colour remapping processes (any colour remapping process(es), whether reciprocal or non-reciprocal) on decoded video data based on information corresponding to one or more CRI SEI messages.

In some examples, video encoder 20 may be configured to generate or otherwise output one or more supplemental enhancement information (SEI) messages in a bitstream including encoded video data. In some examples, SEI messages may be included in a bitstream to carry information that may not be essential in order to decode encoded video data in the bitstream by a decoder (e.g., video decoder 30). SEI messages may be useful in improving the display or processing of decoded video data. For example, SEI messages may be used to improve the view ability of the content (i.e., decoded video data) by increasing, for example, the dynamic range of the decoded video data. As described herein, a destination device 14 may, for example, receive a bitstream including encoded video data and one or more CRI SEI messages. Video decoder 30 may be configured to decode the encoded video data and send the decoded video data to video post-processor 31 for further processing. Video decoder 30 may be configured to send information corresponding to the one or more CRI SEI messages to video post-processor 31. The information corresponding to the one or more CRI SEI messages may be the one or more CRI SEI messages or information derived from the one or more CRI SEI messages. The information derived from the CRI SEI messages may be colour remapping information that video post-processor 31 may be configured to receive, and, in turn, perform one or more processes on the decoded video data based on the information corresponding to the one or more CRI SEI messages.

In some examples, certain application standards (e.g., DVB, ATSC) may require the presence of such SEI messages in the bitstream so that the improvement in quality can be brought to all devices that conform to the application standard (e.g., the carriage of the frame-packing SEI message for frame-compatible plano-stereoscopic 3DTV video format where the frame-packing SEI message is carried for every frame of the video, or the pan-scan scan rectangle SEI message in DVB).

The colour remapping information (CRI) SEI message defined in the HEVC standard may be used by video encoder 20 to convey information to video decoder 30, the information conveyed being used to, for example, map video data (e.g., pictures) in one colour space to another. For example, a CRI SEI message may inform a decoder (e.g., video decoder 30) what, if any, colour remapping processes were performed on the video data before having been encoded by a video encoder (e.g., video encoder 20). As an example, a CRI SEI message may be used to carry information to a video decoder (e.g., video decoder 30) so that decoded video data may be processed in a reciprocal manner or in a manner that is not reciprocal. The syntax of the CRI SEI message may include three parts: a first look-up table referred to as a pre-LUT, a 3×3 matrix of colour remapping coefficients, and a second look-up table referred to as a post-LUT. For each colour component in a colour space (e.g., R, G, and B in the RGB colour space, or Y, Cb, and Cr in the YCbCr colour space), an independent LUT is conventionally defined for both the pre-LUT and post-LUT. However, as described below in more detail below, this may introduce signaling inefficiencies, particularly when the a LUT (e.g., the pre-LUT and/or post-LUT) is the same for two or more colour components in a colour space.

The CRI SEI message, as defined in the HEVC standard, includes the syntax element named colour_remap_id, different values of which may be used to indicate different purposes of the SEI message. FIG. 7 shows one example structure of the colour remapping process (e.g., a colour conversion process such as a colour space conversion process). As shown in FIG. 7, video pre-processor 19 may be configured to input video data into pre-LUT 200. Pre-LUT 200 is a data structure that maps input pixel values to output pixel values. In some examples, pre-LUT 200 may refer to a single pre-LUT applied to each colour channel. In other examples, pre-LUT 200 may refer to one or more colour channel-specific pre-LUTS. In such examples, pre-LUT 200 may include three pre-LUTS, with each of the three pre-LUTs corresponding to a colour channel (e.g., for mapping pixel values in a colour space having three colour channels, such as RGB, pre-LUT 200 may include a first pre-LUT for the red channel, a second pre-LUT for the green channel, and a third pre-LUT for the blue channel). If the colour space includes four colour channels, pre-LUT 200 may similarly refer to four respective channel-specific pre-LUTs.

Video pre-processor 19 may be configured to convert, using pre-LUT 200, pixel values of video data from input pixel values to output pixel values. In the example shown, the video data entering pre-LUT 200 may be referred to as pre-LUT video data, and the video data output by the pre-LUT may be referred to as pre-LUT processed video data. Video pre-processor 19 may be configured to input the pre-LUT processed video data into 3×3 matrix 202, which includes colour remapping coefficients for colour remapping three colour channels in a three colour channel colour space. In other examples involving a four colour channel colour space, the 3×3 matrix 202 may be a 4×4 matrix instead of a 3×3 matrix. Otherwise described, video pre-processor 19 may be configured to apply the 3×3 matrix 202 to pre-LUT processed video data. In the example shown, the video data output by 3×3 matrix 202 may be referred to as matrix-processed video data.

In some examples, 3×3 matrix 202 may or may not be a diagonal matrix. In examples where 3×3 matrix 202 is a diagonal matrix, the diagonal matrix may serve to scale one or more colour channels and/or maintain one or more colour channels. For example, in an RGB colour space example, 3×3 matrix 202 may include a red channel coefficient in the left position in the top row and the value of 0 for the remaining two positions in the top row, a green channel coefficient in the middle position in the middle row and the value of 0 for the remaining two positions in the middle row, and a blue channel coefficient in the right position in the bottom row and the value of 0 for the remaining two positions in the bottom row.

It is understood that 3×3 matrix 202 may be applied by video pre-processor 19 for multiple purposes. For example, video pre-processor 19 may be configured to apply 3×3 matrix 202 to compute a linear block transformation (e.g., RGB to YUV or the like). As another example, video pre-processor 19 may be configured to apply 3×3 matrix 202 to transform one group (e.g., 3 in a 3-primary colour space and 4 in a 4-primary colour space) of colour primaries to another. In other examples, video pre-processor 19 may be configured to apply 3×3 matrix 202 to approximate a complex non-linear transformation on video data, which may be occur in conjunction with or not in conjunction with pre-LUT 200 and/or post-LUT 204.

Video pre-processor 19 may be configured to input matrix-processed video data into post-LUT 204. Post-LUT 204 is a data structure that maps input pixel values to output pixel values. In some examples, post-LUT 204 may refer to a single pre-LUT applied to each colour channel. In other examples, post-LUT 204 may refer to one or more colour channel-specific post-LUTS. In such examples, post-LUT 204 may include three post-LUTS, with each of the three post-LUTs corresponding to a colour channel (e.g., for mapping pixel values in a colour space having three colour channels, such as RGB, post-LUT 204 may include a first post-LUT for the red channel, a second post-LUT for the green channel, and a third post-LUT for the blue channel). If the colour space includes four colour channels, post-LUT 204 may similarly refer to four respective channel-specific post-LUTs. Video pre-processor 19 may be configured to convert, using post-LUT 204, pixel values of matrix-processed video data from input pixel values to output pixel values. In the example shown, the video data output by post-LUT 204 may be referred to as colour remapped video data.

In some examples, post-LUT 204 may be similar to pre-LUT 200 in structure. The 3×3 matrix 202 may, in some examples, not be used. In such examples, pre-LUT 200 and post-LUT 204 may be combined into a single LUT. In examples including 3×3 matrix 202, post-LUT 204 may be described as enabling processing after 3×3 matrix multiplication. For example, post-LUT 204 may be described as enabling non-linear (or linear) mapping of video data output from 3×3 matrix 202 that otherwise may not be possible. In one such example, video pre-processor 19 may be configured to apply pre-LUT 200 to video data to convert the video data from a non-linear domain (e.g., non-linear RGB) to a linear domain (e.g., linear RGB). In turn, video pre-processor 19 may be configured to apply post-LUT 204 to video data (e.g., matrix-processed video data output from 3×3 matrix 202) to convert the video data from a linear domain to a non-linear domain.

Pre-LUT 200, 3×3 matrix 202, and post-LUT 204 may, in some examples, each be described as a colour remapping process, or a CRI SEI message process since a CRI SEI message may be used to carry information to a video decoder (e.g., video decoder 30) so that decoded video data may be processed according to one or more CRI SEI messages (e.g., according to the information carried by one or more CRI SEI messages, which may also be described herein as according to information corresponding to the one or more CRI SEI messages). In some examples, decoded video data may be processed by video post-processor 31 in a reciprocal manner relative to any colour remapping process performed by video pre-processor 19 or not in a reciprocal manner relative to any colour remapping process performed by video pre-processor 19. In some examples, one or more colour remapping processes performed by video post-processor 31 may be reciprocal relative to one or more colour remapping processes performed by video pre-processor 19, and one or more colour remapping processes performed by video post-processor 31 may not be reciprocal relative to one or more colour remapping processes performed by video pre-processor 19. In such examples, video post-processor 31 may be configured to perform a combination of reciprocal and non-reciprocal processes relative to one or more colour remapping processes performed by video pre-processor 19.

FIG. 8 shows one example structure of a colour remapping process, which may or may not be reciprocal to the colour remapping process shown in FIG. 7. In examples where the process in FIG. 8 is a reciprocal process of FIG. 7 (e.g., an inversed colour conversion process), pre-LUT 206 may be the same as post-LUT 204, 3×3 matrix 208 may include colour component coefficients that are reciprocal to the coefficients of 3×3 matrix 202, and post-LUT 210 may be the same as pre-LUT 200. However, as described herein, based on information corresponding to one or more CRI SEI messages, video post-processor 31 may be configured to perform one or more reciprocal and/or one or more non-reciprocal colour remapping processes on decoded video data with which the one or more CRI SEI messages are associated. It is understood that reference to performing any colour remapping process on decoded video data may refer to performing any colour remapping process directly on the decoded video data or indirectly on the decoded video data has been processed (e.g., after one or more non-CRI processes have been applied to the decoded video data). In the indirect example, reference to performing any colour remapping process on decoded video data actually refers to performing any colour remapping process on non-CRI processed decoded video data.

As shown in FIG. 8, video post-processor 31 may be configured to input decoded video data (which may be non-CM processed decoded video data in some examples) into pre-LUT 206. Pre-LUT 206 is a data structure that maps input pixel values to output pixel values. In some examples, pre-LUT 206 may refer to a single pre-LUT applied to each colour channel. In other examples, pre-LUT 206 may refer to one or more colour channel-specific pre-LUTS. In such examples, pre-LUT 206 may include three pre-LUTS, with each of the three pre-LUTs corresponding to a colour channel (e.g., for mapping pixel values in a colour space having three colour channels, such as RGB, pre-LUT 206 may include a first pre-LUT for the red channel, a second pre-LUT for the green channel, and a third pre-LUT for the blue channel). If the colour space includes four colour channels, pre-LUT 206 may similarly refer to four respective channel-specific pre-LUTs.

Video post-processor 31 may be configured to convert, using pre-LUT 206, pixel values of decoded video data (which may be non-CRI processed decoded video data in some examples) from input pixel values to output pixel values. In the example shown, the decoded video data output by the pre-LUT may be referred to as pre-LUT processed decoded video data. Video post-processor 31 may be configured to input the pre-LUT processed decoded video data into 3×3 matrix 208, which includes colour remapping coefficients for colour remapping three colour channels in a three colour channel colour space. In other examples involving a four colour channel colour space, the 3×3 matrix 208 may be 4×4 matrix instead of a 3×3 matrix. Otherwise described, video post-processor 31 may be configured to apply the 3×3 matrix 208 to pre-LUT processed decoded video data. In the example shown, the video data output by 3×3 matrix 208 may be referred to as matrix-processed decoded video data.

In some examples, 3×3 matrix 208 may or may not be a diagonal matrix. In examples where 3×3 matrix 208 is a diagonal matrix, the diagonal matrix may serve to scale one or more colour channels and/or maintain one or more colour channels. For example, in an RGB colour space example, 3×3 matrix 208 may include a red channel coefficient in the left position in the top row and the value of 0 for the remaining two positions in the top row, a green channel coefficient in the middle position in the middle row and the value of 0 for the remaining two positions in the middle row, and a blue channel coefficient in the right position in the bottom row and the value of 0 for the remaining two positions in the bottom row.

It is understood that 3×3 matrix 208 may be applied by video post-processor 31 for multiple purposes. For example, video post-processor 31 may be configured to apply 3×3 matrix 208 to compute a linear block transformation (e.g., YUV to RGB or the like). As another example, video post-processor 31 may be configured to apply 3×3 matrix 208 to transform one group (e.g., 3 in a 3-primary colour space and 4 in a 4-primary colour space) of colour primaries to another. In other examples, video post-processor 31 may be configured to apply 3×3 matrix 208 to approximate a complex non-linear transformation on decoded video data (e.g., the pre-LUT processed decoded video data), which may be occur in conjunction with or not in conjunction with pre-LUT 206 and/or post-LUT 210.

Video post-processor 31 may be configured to input matrix-processed decoded video data into post-LUT 210. Post-LUT 210 is a data structure that maps input pixel values to output pixel values. In some examples, post-LUT 210 may refer to a single pre-LUT applied to each colour channel. In other examples, post-LUT 210 may refer to one or more colour channel-specific post-LUTS. In such examples, post-LUT 210 may include three post-LUTS, with each of the three post-LUTs corresponding to a colour channel (e.g., for mapping pixel values in a colour space having three colour channels, such as RGB, post-LUT 210 may include a first post-LUT for the red channel, a second post-LUT for the green channel, and a third post-LUT for the blue channel). If the colour space includes four colour channels, post-LUT 210 may similarly refer to four respective channel-specific post-LUTs. Video post-processor 31 may be configured to convert, using post-LUT 210, pixel values of matrix-processed decoded video data from input pixel values to output pixel values. In the example shown, the video data output by post-LUT 210 may be referred to as colour remapped decoded video data.

In some examples, post-LUT 210 may be similar to pre-LUT 206 in structure. The 3×3 matrix 208 may, in some examples, not be used. In such examples, pre-LUT 206 and post-LUT 210 may be combined into a single LUT. In examples including 3×3 matrix 208, post-LUT 210 may be described as enabling processing after 3×3 matrix multiplication. For example, post-LUT 210 may be described as enabling non-linear (or linear) mapping of video data output from 3×3 matrix 208 that otherwise may not be possible. In one such example, video post-processor 31 may be configured to apply pre-LUT 206 to decoded video data to convert the video data from a non-linear domain (e.g., non-linear RGB) to a linear domain (e.g., linear RGB). In turn, video post-processor 31 may be configured to apply post-LUT 210 to decoded video data (e.g., matrix-processed decoded video data output from 3×3 matrix 208) to convert the decoded video data from a linear domain to a non-linear domain.

Pre-LUT 206, 3×3 matrix 208, and post-LUT 210 may, in some examples, each be described as a colour remapping process, or a CRI SEI message process. Video post-processor 31 may be configured to process decoded video data according to one or more CRI SEI messages (e.g., according to information carried by one or more CRI SEI messages, which may also be described herein as according to information corresponding to the one or more CRI SEI messages).

In some examples, video pre-processor 19 may be configured to process video data by applying only pre-LUT 200, by applying only 3×3 matrix 202, by applying only post-LUT 204, or any combination of pre-LUT 200, 3×3 matrix 202, and post-LUT 204 to video data. In such examples, video pre-processor 19 may be configured to not apply one or more of pre-LUT 200, 3×3 matrix 202, and post-LUT 204. In some examples, not applying a process may refer to (1) not applying the process or (2) applying a process that outputs the same video data that is input into the process, which may be referred to as an identity process. For example, 3×3 matrix 202 may be an identity matrix, which may also be referred to as a unit matrix. As another example, pre-LUT 200 may be a data structure that maps input pixel values to output pixel values such that the output values equal the input values (i.e., input pixel values do not change upon being mapped by pre-LUT 200). As another example, post-LUT 204 may be a data structure that maps input pixel values to output pixel values such that the output values equal the input values (i.e., input pixel values do not change upon being mapped by post-LUT 204).

Similarly, video post-processor 31 may be configured to process decoded video data by applying only pre-LUT 206, by applying only 3×3 matrix 208, by applying only post-LUT 210, or any combination of pre-LUT 206, 3×3 matrix 208, and post-LUT 210 to video data. In such examples, video post-processor 31 may be configured to not apply one or more of pre-LUT 206, 3×3 matrix 208, and post-LUT 210. In some examples, not applying a process may refer to (1) not applying the process or (2) applying a process that outputs the same video data that is input into the process, which may be referred to as an identity process. For example, 3×3 matrix 208 may be an identity matrix, which may also be referred to as a unit matrix. As another example, pre-LUT 206 may be a data structure that maps input pixel values to output pixel values such that the output values equal the input values (i.e., input pixel values do not change upon being mapped by pre-LUT 206). As another example, post-LUT 210 may be a data structure that maps input pixel values to output pixel values such that the output values equal the input values (i.e., input pixel values do not change upon being mapped by post-LUT 210).

The syntax table of a CRI SEI message as defined by the current HEVC standard is reproduced in Table 2 below. Complete semantics are available in the HEVC standard.

TABLE 2

CRI SEI Message

| colour_remapping_info( payloadSize ) { | Descriptor |
|---|---|
|   colour_remap_id | ue(v) |
|   colour_remap_cancel_flag | u(1) |
|   if( !colour_remap_cancel_flag ) { | |
|     colour_remap_persistence_flag | u(1) |
|     colour_remap_video_signal_info_present_flag | u(1) |
|     if( colour_remap_video_signal_info_present_flag ) { | |
|       colour_remap_full_range_flag | u(1) |
|       colour_remap_primaries | u(8) |
|       colour_remap_transfer_function | u(8) |
|       colour_remap_matrix_coefficients | u(8) |
|     } | |
|     colour_remap_input_bit_depth | u(8) |
|     colour_remap_bit_depth | u(8) |
|     for( c = 0; c < 3; c++ ) { | |
|       pre_lut_num_val_minus1[ c ] | u(8) |
|       if( pre_lut_num_val_minus1[ c ] > 0 ) | |
|         for( i = 0; i <= pre_lut_num_val_minus1[ c ]; i++ ) { | |
|           pre_lut_coded_value[ c ][ i ] | u(v) |
|           pre_lut_target_value[ c ][ i ] | u(v) |
|         } | |
|     } | |
|     colour_remap_matrix_present_flag | u(1) |
|     if( colour_remap_matrix_present_flag ) { | |
|       log2_matrix_denom | u(4) |
|       for( c = 0; c < 3; c++ ) | |
|         for( i = 0; i < 3; i++ ) | |
|           colour_remap_coeffs[ c ][ i ] | se(v) |
|     } | |
|     for( c = 0; c < 3; c++ ) { | |
|       post_lut_num_val_minus1[ c ] | u(8) |
|       if( post_lut_num_val_minus1[ c ] > 0 ) | |
|         for( i = 0; i <= post_lut_num_val_minus1[ c ]; i++ ) { | |
|           post_lut_coded_value[ c ][ i ] | u(v) |
|           post_lut_target_value[ c ][ i ] | u(v) |
|         } | |
|     } | |
|   } | |
| } | |

Some semantics of CRI SEI messages are described herein. Video encoder 20 may be configured to generate a bitstream in accordance with the semantics of CRI messages described herein, and video decoder 30 may be configured to receive the bitstream, parse the CRI SEI message information from the bitstream, and instruct video post-processor 31 to perform (or itself perform) colour remapping in accordance with the colour remapping information conveyed in the CRI SEI message(s) parsed from the bitstream. For example, pre-processor 19 may perform colour remapping on video data before the video data is encoded, such that colour remapped video data is encoded by video encoder 20. In such an example, video encoder 20 may be configured to generate a bitstream in accordance with the semantics of CRI messages described herein to enable video decoder 30 and/or video post-processor 31 to perform inverse colour remapping on decoded video data. While reference herein may be made to video decoder 30 and/or video post-processor 31, it is understood that reference to video decoder 30 or reference to video post-processor 31 both convey video decoder 30 and/or video post-processor 31. Similarly, while reference herein may be made to video encoder 20 and/or video post-processor 31, it is understood that reference to video encoder 20 or reference to video pre-processor 19 both convey video encoder 20 and/or video pre-processor 19.

Decoded video data may refer to decoded video data as output by video decoder 30 or to, for example, decoded video data as processed by one or more non-CRI SEI message process (e.g., an upsampling or downsampling process). In some examples, reference to an inverse colour remapping process may refer to the inverse of the colour remapping process applied to video data before the video data had been encoded by video encoder 20. Video decoder 30 may be configured to receive the bitstream including encoded video data and a colour remapping information (CRI) supplemental enhancement information (SEI) message, wherein the CRI SEI message includes information corresponding to one or more colour remapping processes;

The semantics below are quoted directly from the current HEVC standard for reference.

The colour remapping information SEI message provides information to enable remapping of the reconstructed colour samples of the output pictures. The colour remapping information may be applied directly to the decoded sample values, regardless of whether they are in the luma and chroma domain or the RGB domain. The colour remapping model used in the colour remapping information SEI message is composed of a first piece-wise linear function applied to each colour component (specified by the "pre" set of syntax elements herein), a three by-three matrix applied to the three colour components, and a second piece-wise linear function applied to each colour component (specified by the "post" set of syntax elements herein). NOTE 1—Colour remapping of the output pictures for the display is optional and does not affect the decoding process specified in this Specification.

colour_remap_id contains an identifying number that may be used to identify the purpose of the colour remapping information. The value of colour_remap_id shall be in the range of 0 to $2^{32}-2$, inclusive.

Values of colour_remap_id from 0 to 255 and from 512 to $2^{31}-1$ may be used as determined by the application. Values of colour_remap_id from 256 to 511, inclusive, and from $2^{31}$ to $2^{32}-2$, inclusive are reserved for future use by ITU-T|ISO/IEC. Decoders shall ignore all colour remapping information SEI messages containing a value of colour_remap_id in the range of 256 to 511, inclusive, or in the range of $2^{31}$ to $2^{32}-2$, inclusive, and bitstreams shall not contain such values. NOTE 2—The colour_remap_id can be used to support different colour remapping processes that are suitable for different display scenarios. For example, different values of colour_remap_id may correspond to different remapped colour spaces supported by displays.

colour_remap_matrix_coefficients has the same semantics as specified in clause E.3.1 for the matrix_coeffs syntax element, except that colour_remap_matrix_coefficients specifies the colour space of the remapped reconstructed picture, rather than the colour space used for the CLVS. When not present, the value of colour_remap_matrix_coefficients is inferred to be equal to the value of matrix_coeffs.

colour_remap_input_bit_depth specifies the bit depth of the luma and chroma components or the RGB components of the associated pictures for purposes of interpretation of the colour remapping information SEI message. When any colour remapping information SEI messages is present with the value of colour_remap_input_bit_depth not equal to the bit depth of the coded luma and chroma components or that of the coded RGB components, the SEI message refers to the hypothetical result of a transcoding operation performed to convert the coded video to a converted video with bit depth equal to colour_remap_input_bit_depth.

The value of colour_remap_input_bit_depth shall be in the range of 8 to 16, inclusive. Values of colour_remap_input_bit_depth from 0 to 7, inclusive, and from 17 to 255, inclusive, are reserved for future use by ITU-T|ISO/IEC.

Decoders shall ignore all colour remapping SEI messages that contain a colour_remap_input_bit_depth in the range of 0 to 7, inclusive, or in the range of 17 to 255, inclusive, and bitstreams shall not contain such values.

colour_remap_bit_depth specifies the bit depth of the output of the colour remapping function described by the colour remapping information SEI message.

The value of colour_remap_bit_depth shall be in the range of 8 to 16, inclusive. Values of colour_remap_bit_depth from 0 to 7, inclusive, and in the range of 17 to 255, inclusive, are reserved for future use by ITU-T|ISO/IEC. Decoders shall ignore all colour remapping SEI messages that contain a value of colour_remap_bit_depth from 0 to 7, inclusive, or in the range of 17 to 255, inclusive.

prelut_num_val_minus1[c] plus 1 specifies the number of pivot points in the piece-wise linear remapping function for the c-th component, where c equal to 0 refers to the luma or G component, c equal to 1 refers to the Cb or B component, and c equal to 2 refers to the Cr or R component. When pre_lut_num_val_minus1[c] is equal to 0, the default end points of the input values are 0 and $2^{colour\_remap\_input\_bit\_depth}-1$, and the corresponding default end points of the output values are 0 and $2^{colour\_remap\_bit\_depth}-1$, for the c-th component. In bitstreams conforming to this version of this Specification, the value of pre_lut_num_val_minus1[c] shall be in the range of 0 to 32, inclusive.

prelut_coded_value[c][i] specifies the value of the i-th pivot point for the c-th component. The number of bits used to represent pre_lut_coded_value[c][i] is ((colour_remap_input_bit_depth+7)>>3)<<3.

pre_lut_target_value[c][i] specifies the value of the i-th pivot point for the c-th component. The number of bits used to represent pre_lut_target_value[c][i] is ((colour_remap_bit_depth+7)>>3)<<3.

The semantics of post_lut_num_val_minus[ ], post_lut_coded_value[ ][ ], and post_lut_target_value[ ][ ] are similar to the semantics of pre_lut_num_val_minus[ ], pre_lut_coded_value[ ][ ], and pre_lut_target_value[ ][ ], respectively; the number of bits used to represent post_lut_coded_value[ ][ ], and post_lut_target_value[ ][ ] is equal to colour_remap_bit_depth.

Video decoder 30 may be configured to perform the inverse of video encoder 20 to decode video data. The process to reconstruct the video data may be generally reciprocal to the process performed by video encoder 20. As described above, video post-processor 31 may be configured to perform the inverse of video pre-processor 19, which, in some examples, may serve to convert the decoded video data into a form suitable for display. For example, video post-processor 31 may perform integer-to-floating conversion, colour conversion from the compact or robust colour space, and/or the inverse of the dynamic range compacting to generate video data suitable for display.

Video encoder 20, video decoder 30, video pre-processor 19, video post-processor 31, and/or any combination thereof (e.g., video encoder 20 including video pre-processor 19, video decoder 30 including video post-processor 31, a video coder, a video coder including video pre-processor 19 and video post-processor 31) may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (which may be referred to as a CODEC or coder) in a respective device.

In some examples, video encoder 20 and video decoder 30 may be configured to operate according to a video coding standard, such as ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC) including its extensions (e.g., the Scalable Video Coding (SVC) and Multi-view Video Coding (MVC) extensions), and ITU-T H.265 (also known as HEVC) including its extensions (e.g., the range and screen content coding extensions).

In HEVC and other video coding standards, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

Video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In a monochrome picture or a picture that has three separate colour planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other video coding standards, such as H.264/AVC. However, a CTU is not necessarily limited to a particular size and may include one or more coding units (CUs). A slice may include an integer number of CTUs ordered consecutively in the raster scan.

This disclosure may use the term "video unit" or "video block" to refer to one or more blocks of samples and syntax structures used to code samples of the one or more blocks of samples. Example types of video units may include CTUs, CUs, PUs, transform units (TUs) in HEVC, or macroblocks, macroblock partitions, and so on in other video coding standards.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may comprise a coding block of luma samples and two corresponding coding blocks of chroma samples of a picture that has a luma sample array, a Cb sample array and a Cr sample array, and syntax structures used to code the samples of the coding blocks. In a monochrome picture or a picture that has three separate colour planes, a CU may comprise a single coding block and syntax structures used to code the samples of the coding block.

Video encoder 20 may partition a coding block of a CU into one or more prediction blocks. A prediction block may be a rectangular (i.e., square or non-square) block of samples on which the same prediction is applied. A prediction unit (PU) of a CU may comprise a prediction block of luma samples, two corresponding prediction blocks of chroma samples of a picture, and syntax structures used to predict the prediction block samples. In a monochrome picture or a picture that have three separate colour planes, a PU may comprise a single prediction block and syntax structures used to predict the prediction block samples. Video encoder 20 may generate predictive luma, Cb and Cr blocks for luma, Cb and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate the predictive blocks of a PU, video encoder 20 may generate the predictive blocks of the PU based on decoded samples of one or more pictures other than the picture associated with the PU. Inter prediction may be uni-directional inter prediction (i.e., uni-prediction) or bi-directional inter prediction (i.e., bi-prediction). To perform uni-prediction or bi-prediction, video encoder 20 may generate a first reference picture list (RefPicList0) and a second reference picture list (RefPicList1) for a current slice.

Each of the reference picture lists may include one or more reference pictures. When using uni-prediction, video encoder 20 may search the reference pictures in either or both RefPicList0 and RefPicList1 to determine a reference location within a reference picture. Furthermore, when using uni-prediction, video encoder 20 may generate, based at least in part on samples corresponding to the reference location, the predictive sample blocks for the PU. Moreover, when using uni-prediction, video encoder 20 may generate a single motion vector that indicates a spatial displacement between a prediction block of the PU and the reference location. To indicate the spatial displacement between a prediction block of the PU and the reference location, a motion vector may include a horizontal component specifying a horizontal displacement between the prediction block of the PU and the reference location and may include a vertical component specifying a vertical displacement between the prediction block of the PU and the reference location.

When using bi-prediction to encode a PU, video encoder 20 may determine a first reference location in a reference picture in RefPicList0 and a second reference location in a reference picture in RefPicList1. Video encoder 20 may then generate, based at least in part on samples corresponding to the first and second reference locations, the predictive blocks for the PU. Moreover, when using bi-prediction to encode the PU, video encoder 20 may generate a first motion vector indicating a spatial displacement between a sample block of the PU and the first reference location and a second motion vector indicating a spatial displacement between the prediction block of the PU and the second reference location.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block.

Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb and, Cr residual blocks of a CU into one or more luma, Cb, and Cr transform blocks. A transform block may be a rectangular block of samples on which the same transform is applied. A transform unit (TU) of a CU may comprise a transform block of luma samples, two corresponding transform blocks of chroma samples, and syntax structures used to transform the transform block samples. In a monochrome picture or a picture that has three separate colour planes, a TU may comprise a single transform block and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. Furthermore, video encoder 20 may inverse quantize transform coefficients and apply an inverse transform to the transform coefficients in order to reconstruct transform blocks of TUs of CUs of a picture. Video encoder 20 may use the reconstructed transform blocks of TUs of a CU and the predictive blocks of PUs of the CU to reconstruct coding blocks of the CU. By reconstructing the coding blocks of each CU of a picture, video encoder 20 may reconstruct the picture. Video encoder 20 may store reconstructed pictures in a decoded picture buffer (DPB). Video encoder 20 may use reconstructed pictures in the DPB for inter prediction and intra prediction.

After video encoder 20 quantizes a coefficient block, video encoder 20 may entropy encode syntax elements that indicate the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Video encoder 20 may output a bitstream that includes a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate a RBSP for a picture parameter set (PPS), a second type of NAL unit may encapsulate a RBSP for a coded slice, a third type of NAL unit may encapsulate a RBSP for Supplemental Enhancement Information (SEI), and so on. A PPS is a syntax structure that may contain syntax elements that apply to zero or more entire coded pictures. NAL units that encapsulate RBSPs for video coding data (as opposed to RBSPs for parameter sets and SEI messages) may be referred to as video coding layer (VCL) NAL units. A NAL unit that encapsulates a coded slice may be referred to herein as a coded slice NAL unit. A RBSP for a coded slice may include a slice header and slice data.

Video decoder 30 may receive a bitstream. In addition, video decoder 30 may parse the bitstream to decode syntax elements from the bitstream. Video decoder 30 may reconstruct the pictures of the video data based at least in part on the syntax elements decoded from the bitstream. The process to reconstruct the video data may be generally reciprocal to the process performed by video encoder 20. For instance, video decoder 30 may use motion vectors of PUs to determine predictive blocks for the PUs of a current CU. Video decoder 30 may use a motion vector or motion vectors of PUs to generate predictive blocks for the PUs.

In addition, video decoder 30 may inverse quantize coefficient blocks associated with TUs of the current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive sample blocks for PUs of the current CU to corresponding samples of the transform blocks of the TUs of the current CU. By reconstructing the coding blocks for each CU of a picture, video decoder 30 may reconstruct the picture. Video decoder 30 may store decoded pictures in a decoded picture buffer for output and/or for use in decoding other pictures.

Next generation video applications and services are anticipated to operate with video data representing captured scenery with HDR (High Dynamic Range) and WCG (Wide Colour Gamut). Parameters of the utilized dynamic range and colour gamut are two independent attributes of video content, and their specification for purposes of digital television and multimedia services are defined by several international standards. For example, ITU-R Rec. 709 defines parameters for HDTV (high definition television), such as Standard Dynamic Range (SDR) and standard colour gamut, and ITU-R Rec. 2020 specifies UHDTV (ultra-high definition television) parameters such as HDR and WCG. There are also other standards developing organization (SDOs) documents that specify dynamic range and colour gamut attributes in other systems. For example, P3 colour gamut is defined in SMPTE-231-2 (Society of Motion Picture and Television Engineers) and some parameters of HDR are defined in STMPTE-2084.

In some examples, dynamic range is typically defined as the ratio between the maximum and minimum brightness of the video signal (e.g., video data). Dynamic range may be measured in terms of 'f-stop,' where one f-stop corresponds to a doubling of the dynamic range of video data. In MPEG's definition, HDR content is such content that features brightness variation with more than 16 f-stops. In some terms, levels between 10 and 16 f-stops are considered as intermediate dynamic range, but may be considered HDR in other definitions. In some examples, HDR video content may be any video content that has a higher dynamic range than traditionally used video content with a standard dynamic range (an example of SDR video content includes video content as specified by ITU-R Rec. BT. 709). At the same time, the human visual system (HVS) is capable of perceiving a much larger dynamic range. However, the HVS includes an adaptation mechanism to narrow a so-called simultaneous range. Simultaneous range may refer to the ability of the HVS to perceive a sub-range of a luminance range (instead of the entire range) at an instantaneous point in time due to, for example, the ability of the HVS to perform adaptation (e.g., dilating pupils). Otherwise explained, the HVS may have a certain range of luminance perception at any given time. The HVS may perform adaptation to move the simultaneous range within the overall luminance range of the HVS.

Figure 2:
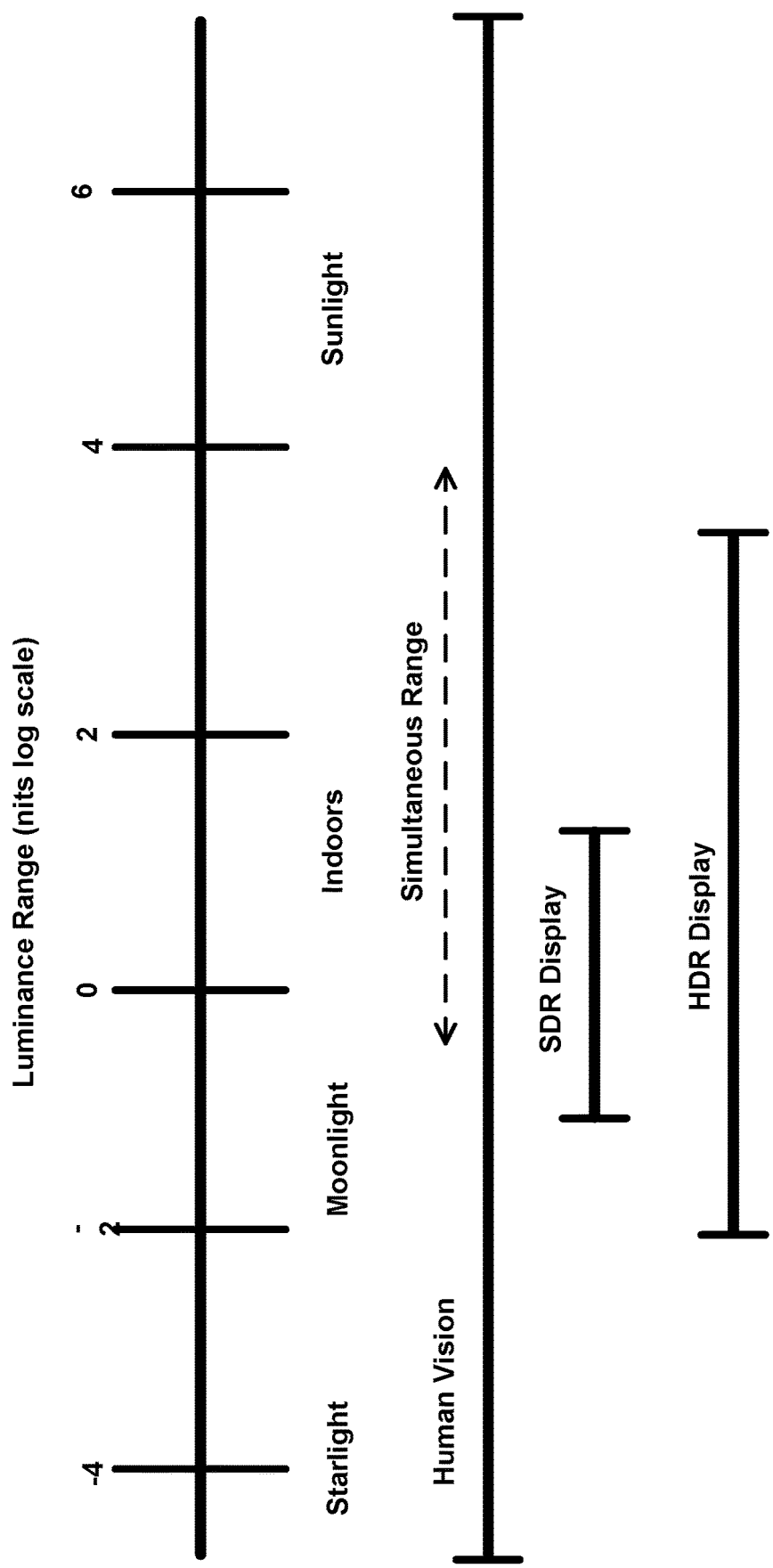
FIG. 2 is a drawing illustrating the concept of high dynamic range (HDR) data.

FIG. 2 shows an example of the HVS relative to example display capabilities (e.g., an SDR display and an HDR display). For example, FIG. 2 shows a luminance range (and an example of simultaneous range within the luminance range of the HVS) relative to SDR of HDTV video data, expected HDR of UHDTV video data, and the dynamic range perceptible by the HVS.

In some examples, video applications and services may be regulated by ITU-R Recommendation BT.709 (also referred to as Rec.709 or BT.709) and may provide SDR, typically supporting a range of brightness (or luminance) of around 0.1 to 100 nits, leading to less than 10 f-stops. A nit is a unit of measurement for luminance. For example, one nit equals one candela (cd) per meter squared ($m^2$). The next generation video applications and services are expected to provide dynamic range of up to 16 f-stops. Some initial parameters have been specified in SMPTE-2084 and Rec. 2020. For example, ST 2084 defines an EOTF (electo optical transfer function) that is suitable to convert HDR video data between linear and non-linear space. As another example, Rec. 2020 defines colour primaries that may be used to represent video data such that more colour (e.g., a larger colour gamut) than the primaries described by Rec. 709 (widely used for SDR video data).

Figure 3:
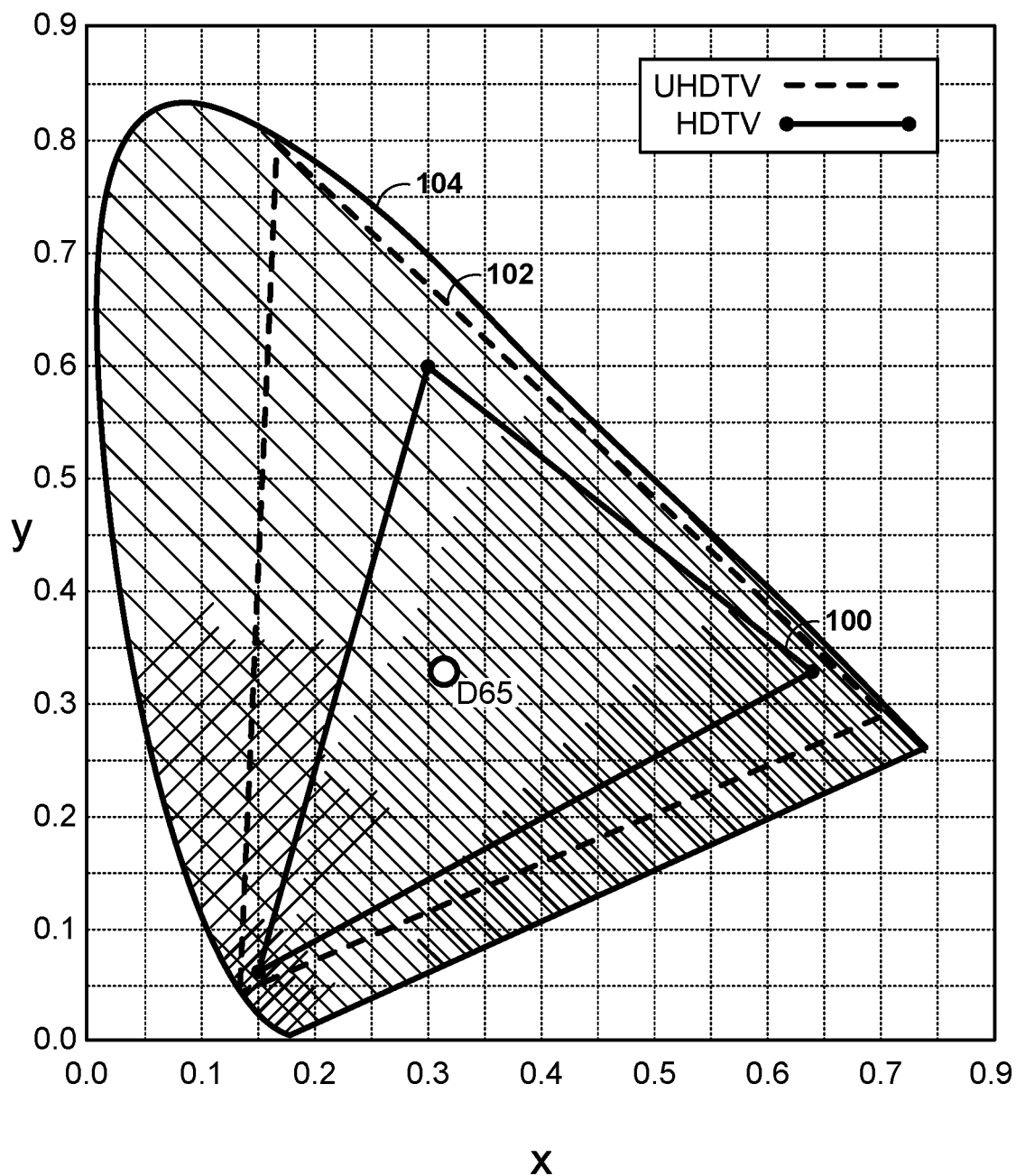
FIG. 3 is a conceptual diagram comparing colour gamuts of video signals of high definition television (HDTV) (BT.709) and ultra high definition television (UHDTV) (BT.2020).

Another aspect for a more realistic video experience besides HDR is the colour dimension, which is conventionally defined by the colour gamut. FIG. 3 is a conceptual diagram showing an SDR colour gamut for HDTV (triangle 100 based on the BT.709 colour red, green and blue colour primaries), and the wider colour gamut for UHDTV (triangle 102 based on the BT.2020 colour red, green and blue colour primaries). FIG. 3 also depicts the so-called spectrum locus (delimited by the tongue-shaped area 104), representing limits of the natural colours. As illustrated by FIG. 3, moving from BT.709 to BT.2020 colour primaries aims to provide UHDTV services with about 70% more colours. D65 specifies the white colour for given specifications (e.g., BT.709 and/or BT.2020 specifications).

A few examples of colour gamut specifications are shown in Table 1.

TABLE 1

Example Colour Gamut Parameters
RGB colour space parameters

| | White point | | Primary colours | | | | | |
|---|---|---|---|---|---|---|---|---|
| Colour space | $x_w$ | $y_w$ | $x_r$ | $y_r$ | $x_g$ | $y_g$ | $x_b$ | $y_b$ |
| DCI-P3 | 0.314 | 0.351 | 0.680 | 0.320 | 0.265 | 0.690 | 0.150 | 0.060 |
| ITU-R BT.709 | 0.3127 | 0.3290 | 0.64 | 0.33 | 0.30 | 0.60 | 0.15 | 0.06 |
| ITU-R BT.2020 | 0.3127 | 0.3290 | 0.708 | 0.292 | 0.170 | 0.797 | 0.131 | 0.046 |

As can be seen in Table 1, a colour gamut may be defined by the x and y values of a white point, and by the x and y values of the primary colours (e.g., red (R), green (G), and blue (B). The x and y values represent the chromaticity (x) and the brightness (y) of the colours, as is defined by the CIE 1931 colour space. The CIE 1931 colour space defines the links between pure colours (e.g., in terms of wavelengths) and how the human eye perceives such colours.

HDR/WCG video data is typically acquired and stored at a very high precision per component (even floating point), with the 4:4:4 chroma format (also referred to as the 4:4:4 chroma sub-sampling format) and a very wide colour space (e.g., CIE 1931 XYZ also referred to as CIE XYZ). This representation targets high precision and is almost mathematically lossless. However, such a format for storing HDR/WCG video data may include a lot of redundancies and may not be optimal for compression purposes. A lower precision format with HVS-based assumptions is typically utilized for state-of-the-art video applications.

One example of a video data format conversion process for purposes of compression includes three major processes, as shown in FIG. 4. The techniques of FIG. 4 may be performed by video pre-processor 19. Video pre-processor 19 may be configured to receive linear RGB data 110 from video source 18. Linear RGB data 110 may be HDR/WCG video data and may be in a floating point representation. Linear RGB data 110 may be compacted using a non-linear transfer function (TF) 112 for dynamic range compacting. Video pre-processor 19 may apply transfer function 112 to linear RGB data 110 to compact linear RGB data 110 using any number of non-linear transfer functions (e.g., SMPTE-2084). In some examples, video pre-processor 19 may perform colour conversion process 114 to convert the compacted data generated or otherwise output by the TF 112 process into a target colour space (e.g., YCbCr) that is more suitable for compression by a video encoder (e.g., video encoder 20). The target colour space may be a more compact or robust colour space. The video data generated or otherwise output by the colour conversion process 114 may then be quantized by video pre-processor 19 using quantization process 116 to, for example, convert the video data generated or otherwise output by the colour conversion process 114 from floating point representation to integer representation to produce processed pre-encoded video data 118 (which may, in some examples, refer to converted HDR video data). In this example, processed pre-encoded video data 118 is in an integer representation, which may be a format more suitable for compression by a video encoder (e.g., video encoder 20 applying, for example, HEVC techniques). The order of the processes depicted in FIG. 4 is given as an example, and may vary in other applications. For example, the colour conversion process may precede the TF process. In addition, additional processing (e.g., spatial subsampling) may be applied to colour components.

The inverse of the video data format conversion process described with respect to FIG. 4 may be performed on decoded video data, in a manner such as that shown in FIG. 5. The techniques of FIG. 5 may be performed by video post-processor 31. Video post-processor 31 may be configured to receive decoded video data 120 (which may, in some examples, refer to HDR video data) from video decoder 30. For example, video encoder 20 may receive processed pre-encoded video data 118 and encode this video data to produce encoded video data. Video decoder 30 may receive and decode the encoded video data derived from processed pre-encoded video data 118 to generate or otherwise output decoded video data 120. In some examples, decoded video data 120 may be the same as processed pre-encoded video data 118 (e.g., due to lossless video compression). In other examples, decoded video data 120 may be similar to but not the same as processed pre-encoded video data 118 (e.g., due to lossy video compression or data corruption).

Decoded video data 120 may be inverse quantized by inverse quantization process 122 performed by video post-processor 31. Then, an inverse colour conversion process 124 may be applied to the inverse quantized decoded video data by video post-processor 31. The inverse colour conversion process 124 may be the inverse of colour conversion process 114. For example, the inverse colour conversion process 124 may convert the inverse quantized decoded video data from a first colour space (e.g., YCrCb) to a second colour space (e.g., RGB). Next, inverse transfer function 126 may be applied by video post-processor 31 to the inverse colour converted decoded video data to add back the dynamic range that, in some examples, may have been compacted by transfer function 112 to generate or otherwise output linear RGB data 128. In some examples, linear RGB data 128 may be the same as linear RGB data 11 (e.g., due to lossless video compression). In other examples, linear RGB data 128 may be similar to but not the same as linear RGB data 110 (e.g., due to lossy video compression or data corruption).

Figure 6:
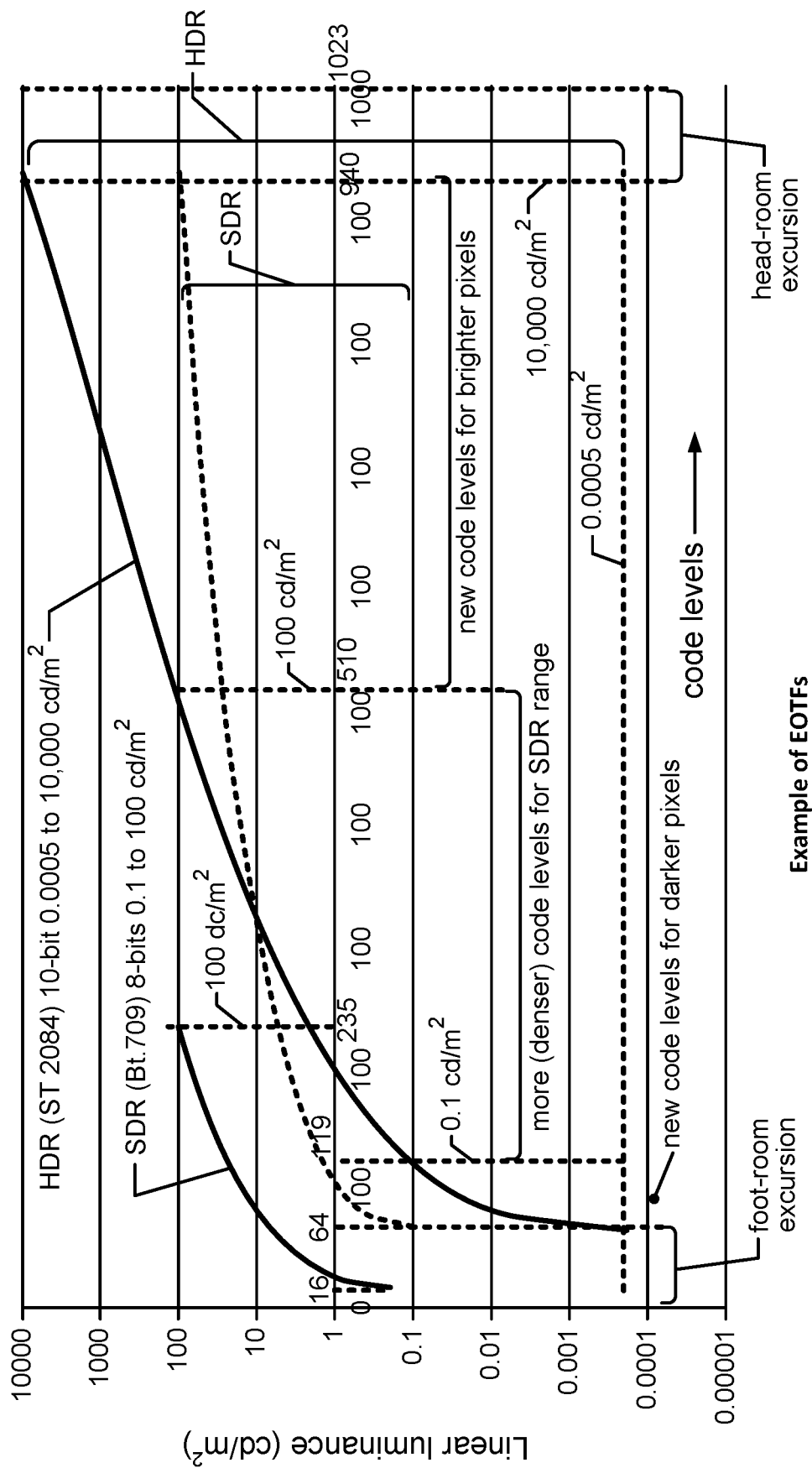
FIG. 6 is conceptual diagram showing example transfer functions.

The techniques depicted in FIG. 4 will now be discussed in more detail. In general, a transfer function is applied to data (e.g., HDR/WCG video data) by video pre-processor 19 to compact the dynamic range of the data. Such compaction allows the data to be represented with fewer bits. In one example, transfer function 112 may be a one-dimensional (1D) non-linear function and may reflect the inverse of an electro-optical transfer function (EOTF) of the end-user display (e.g., as specified for SDR in Rec.709). In another example, transfer function 112 may approximate the HVS perception to brightness changes (e.g., the PQ transfer function specified in SMPTE-2084 for HDR). The inverse process of the OETF is the EOTF (electro-optical transfer function), which maps the code levels back to luminance. FIG. 6 shows several examples of non-linear transfer functions. The transfer functions may be applied to each colour channel in a colour space (e.g., the R, G, and B channels in the RGB colour space) separately.

In the context of this disclosure, the terms "signal value" or "colour value" may be used to describe a luminance level corresponding to the value of a specific colour component (such as R, G, B, or Y) for an image element. The signal value is typically representative of a linear light level (luminance value). The terms "code level" or "digital code value" may refer to a digital representation of an image signal value. Typically, such a digital representation is representative of a nonlinear signal value. An EOTF represents the relationship between the nonlinear signal values provided to a display device (e.g., display device 32) and the linear colour values produced by the display device.

Regarding colour conversion process 114 (shown in, for example, FIG. 4) performed by video pre-processor 19, RGB data is typically utilized as the input colour space, since RGB is the type of data that is typically produced by image capturing sensors. However, the RGB colour space has high redundancy among its components and is not optimal for compact representation. To achieve more compact and a more robust representation, RGB components may be converted by video pre-processor 19 to a more uncorrelated colour space (e.g., YCbCr) that is more suitable for compression. The YCbCr colour space, for example, separates the brightness in the form of luminance (Y) and colour information (Cr and Cb) in different, less correlated components. In this context, a robust representation may refer to a colour space featuring higher levels of error resilience when compressed at a constrained bitrate.

Following colour conversion process 114 (also referred to as a colour transform process), the colour converted video data in the target colour space may still be represented at a high bit-depth (e.g. floating point accuracy). Quantization process 116 (shown in, for example, FIG. 4) performed by video pre-processor 19 may quantize the colour converted video data to a target bit-depth. In some examples, a bit-depth of 10-12 bits in combination with the PQ transfer function may be sufficient to provide HDR data of 16 f-stops with distortion below the Just-Noticeable Difference (JND). In general, a JND is the amount something (e.g., video data) must be changed in order for a difference to be noticeable (e.g., by the HVS). Data represented with 10-bit accuracy (i.e., having a bit-depth of 10) can be further coded by a video encoder (e.g., video encoder 20) in accordance with video coding standards. This quantization is an element of lossy coding and is a source of inaccuracy introduced to converted data.

This disclosure identifies problems with the CRI SEI message as currently defined by the HEVC standard, and presents example techniques to address the problems identified herein.

As one example problem, the semantics of an SEI message, as defined by the current HEVC standard, is unclear as to where the information contained in an SEI message can be applied in the processing of decoded video data by video decoder 30 and/or video post-processor 31. For example, the current HEVC standard describes in the semantics that an SEI message may be applied directly to decoded video data; however, it is unclear as to whether an SEI message can be applied to decoded video data produced as a result of application of one or more processes. For instance, it is unclear whether the processes of the CRI SEI message, such as one or more of the pre-LUT 206, 3×3 matrix 208, or post-LUT 210, can be applied by video decoder 30 and/or video post-processor 31 after de-quantization (e.g., inverse quantization) is performed on or otherwise applied to decoded video data, after a non-CM SEI message process (e.g., a filtering process, an upsampling process, a down-sampling process, an inverse quantization process, a change of colour primaries used to represent components of decoded video data, or any other non-CRI SEI message process) is performed on or otherwise applied to decoded video data, and/or after a colour space conversion is performed on or other applied to decoded video data.

As another example problem, the current HEVC standard defines the CRI SEI message as including the syntax element colour_remap_id to indicate the purpose of the SEI message. However, the semantics for the CRI SEI message defined by the current HEVC standard do not specify the processing of concurrent or sequential CRI SEI messages with different IDs (e.g., different values for colour_remap_id), and whether concurrent or sequential CRI SEI messages may be signaled for the same decoded video data (e.g., the same decoded picture) and/or applied to the same decoded video data (e.g., the same decoded picture). Even if multiple CRI SEI messages are included, the current HEVC standard is unclear regarding the order in which such multiple CRI SEI messages are to be applied.

As another example problem, the syntax of the CRI SEI message is defined by the current HEVC standard as including fixed length coded pivot points with a specified bit depth derivation as a function of input data bit depth. The number of bits used to code the pivot points is also often large even when the bit-depth of the input or output specified in the CRI SEI message is less. For example, according to the current HEVC standard, even if the bit-depth of the input and output of the LUTs (e.g., the pre-LUT and post-LUTS, respectively) of the CRI SEI message is 10 bits, the pivot points are signaled with 16-bit accuracy. This needlessly increases the number of bits by 60% more than what is needed, which has a larger impact when the CRI SEI is signaled every frame. Even if the actual number of bits used to indicate the pivot points is not many compared to the overall bitstream, when more pivot points are to be signaled per CRI SEI message and this information is signaled for more than one component and for every frame, the increase in the number of bits is non-negligible.

As another example problem, an outcome of determined accuracy of LUT pivot points signaling may be based on the LUT construction process, as defined by the current HEVC standard. Some CRI applications processing a 10-bit signal may choose to utilize specified accuracy in full, which would result in the construction of 16-bit accurate LUT tables consisting of 65536 elements for each signal (e.g., colour) component (e.g. Y, Cb, and Cr; or R, G, and B). The techniques described herein improve upon these problems. For example, one or more of video encoder 20, video pre-processor 19, video decoder 30, and/or video post-processor 31 are configured to perform one or more techniques described herein to address one or more problems identified herein. For example, the techniques described herein may reduce memory requirements (e.g., by not signaling redundant LUTs), reduce computational complexity, guarantee quality of delivered HDR/WCG, and/or compliance to a specification. As an example, this disclosure introduces changes in the semantics and syntax of CRI SEI messages, which results in changes to how one or more of one or more of video encoder 20, video pre-processor 19, video decoder 30, and/or video post-processor 31 process video data. For example, the changes to the semantics and/or syntax of CRI SEI messages described herein may change what information is signaled by video encoder 20 in a bitstream. As another example, the changes to the semantics and/or syntax of CRI SEI messages described herein may affect what information a CRI SEI message received by video decoder 30 contains. As another example, the changes to the semantics and/or syntax of CRI SEI messages described herein how video decoder 30 and/or video post-processor 31 processes decoded video data, such as in accordance with one or more CRI SEI messages.

As another example problem, the syntax of the CRI SEI message is currently designed such that the pivot points of a LUT (e.g., pre-LUT and/or post-LUT) that are used for one component of the signal cannot be applied directly to other components unless they are explicitly signaled. For example, pivot points that are used for the Y component of decoded video data (e.g., a decoded picture) cannot be applied directly to either the Cb or Cr components. This increases the number of bits needed to signal the SEI message.

This disclosure sets forth several techniques to improve the CRI SEI message or possible derivation of similar SEI message signaling and processing which is specified or to be specified in video coding standards, such as H.265/HEVC, H.264/AVC, Blu-ray Disc Association (BDA), MPEG, or others. To address the problems described above, one or more techniques described herein may be applied by or otherwise be performed by one or more of video encoder 20, video pre-processor 19, video decoder 30, and/or video post-processor 31. One or more techniques described herein may be applied independently or in any combination.

In one example, video encoder 20 may be configured to signal one or more CRI SEI messages in accordance with new semantics, and/or video decoder 30 and/or video post-processor 31 may be configured to process one or more CRI SEI messages in accordance with new semantics. The new semantics may, for example, enable video encoder 20 to signal one or more CRI SEI messages as described herein. The new semantics may, for example, enable video decoder 30 and/or video post-processor 31 to apply one or more processes corresponding to a CRI SEI message (e.g., pre-LUT 206, 3×3 matrix 208, and post-LUT 210) directly on decoded video data or indirectly on decoded video data. For example, according to the new semantics with which video decoder 30 and/or video post-processor 31 may be configured to process one or more CRI SEI messages, video decoder 30 and/or video post-processor 31 may be configured to apply to apply one or more processes corresponding to a CRI SEI message to decoded video data (e.g., decoded video samples) after some processing (i.e., indirectly on the decoded video data). In other examples, video decoder 30 and/or video post-processor 31 may be configured to apply to apply one or more processes corresponding to a CRI SEI message directly to decoded video data. Video decoder 30 and/or video post-processor 31 may be configured to determine whether to apply one or more processes corresponding to a CRI SEI message directly or indirectly on decoded video data based on the value of a syntax element, such as the value of colour_remap_id.

Figure 9:
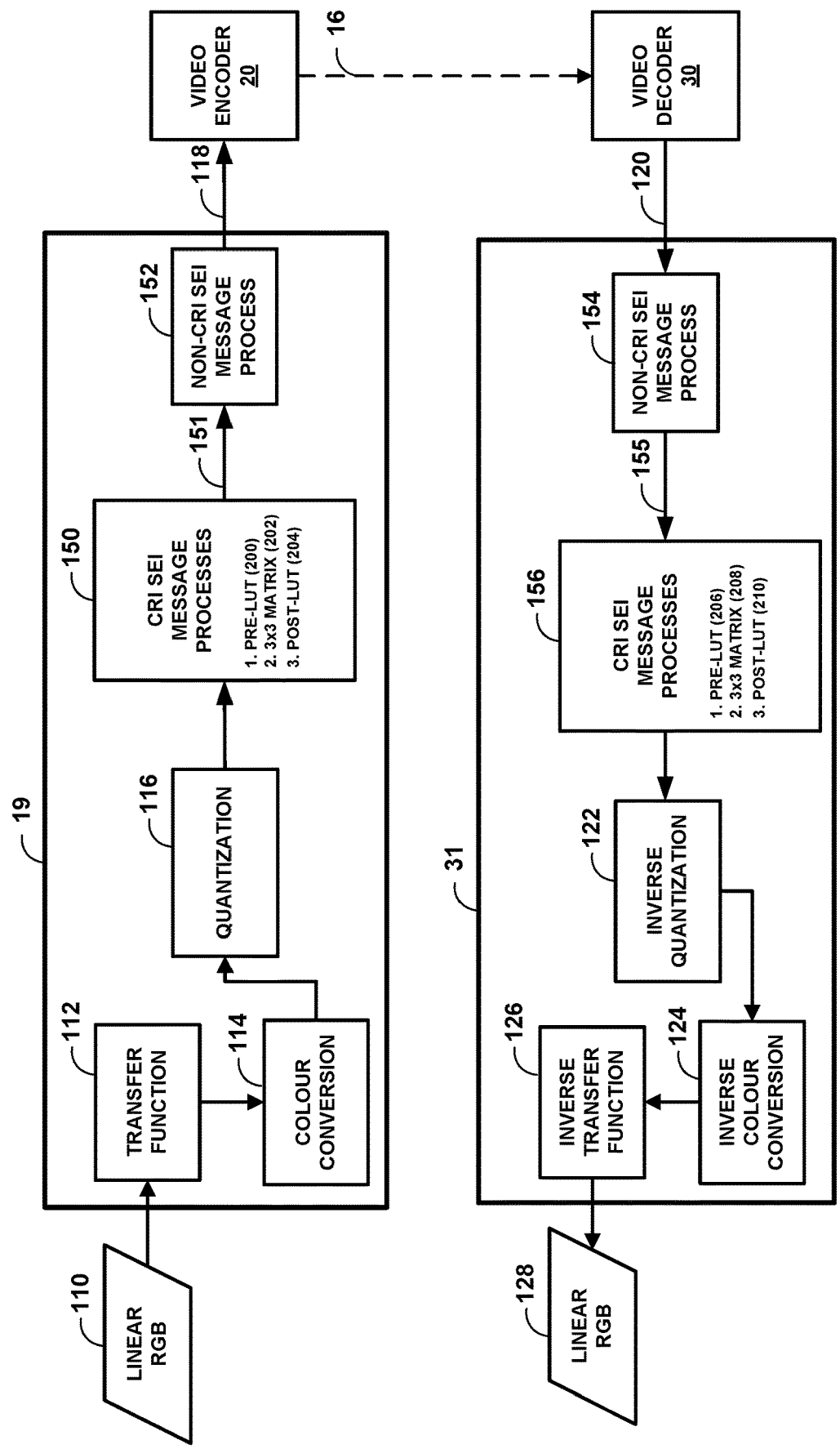
FIG. 9 illustrates one example technique in accordance with one or more techniques of this disclosure.

An example of such a technique is illustrated in FIG. 9, which illustrates an example of colour remapping processes corresponding to a CRI SEI message not directly being applied to decoded video data. Instead, as shown in the example of FIG. 9, quantized video data generated by quantization process 116 may be processed by the colour remapping processes 150 in the order illustrated. Each of the processes illustrated within video pre-processor 19 may be performed by video pre-processor 19. In other examples, one or more processes illustrated within video pre-processor 19 may be performed by video encoder 20. In examples of FIG. 9 where the colour remapping processes 150 and 156 perform colour conversion, video pre-processor 19 and video post-processor 31 may be respectively configured to not perform colour conversion process 114 and inverse colour conversion process 124. In such examples, video pre-processor 19 may be configured to perform quantization process 116 on data generated or otherwise output by the TF 112. Similarly, video post-processor 31 may be configured to apply inverse transfer function 126 on data generated or otherwise output by inverse quantization process 122.

In some examples, one or more other processes illustrated within video pre-processor 19 may be applied to the video data in between the application of any two colour remapping processes 150 (e.g., pre-LUT 200, 3×3 matrix 202, and post-LUT 204). Colour remapped video data 151 may then be processed by one or more non-colour remapping processes 152, such as a downsampling or upsampling process. For example, colour remapped video data 151 may be in accordance with a 4:4:4 chroma format. One or more non-colour remapped processes may include a downsampling process such that processed pre-encoded video data 118 has a 4:2:0 chroma format in this example.

Similarly, on the decoder side, video decoder 30 may output decoded video data 120 (which may, in some examples, refer to decoded HDR video data), which may then be processed by video post-processor 31, such as in the manner shown in FIG. 9. Each of the processes illustrated within video post-processor 31 may be performed by video post-processor 31. In some examples, one or more other processes illustrated within video post-processor 31 may be applied to the decoded video data in between the application of any two colour remapping processes 156 (e.g., pre-LUT 206, 3×3 matrix 208, and post-LUT 210) corresponding to a CRI SEI message.

For example, video post-processor 31 may receive decoded video data 120 from video decoder 30, and perform one or more non-colour remapping processes 154 (e.g., a filtering process, a downsampling process, or an upsampling process) on the decoded video data.

In some examples, one or more non-colour remapping processes 154 may be the inverse of one or more non-colour remapping processes 152. For example, in the example above involving downsampling from 4:4:4 to 4:2:0, decoded video data 120 output by video decoder 30 may be in the 4:2:0 chroma format as a result. Decoded video data 120 may then be processed by one or more non-colour remapping processes 154 performed by video post-processor 31. As described herein, a non-colour remapping process 154 may include, for example, a filtering process, an upsampling process, a downsampling process, an inverse quantization process, a change of colour primaries used to represent components of decoded video data, or any other non-CRI SEI message process. In one example, a non-colour remapping process 154 may include an inverse downsampling process (i.e., an upsampling process) to convert decoded video data 120 to a 4:4:4 chroma format. For example, non-CM processed decoded video data 155 may be in accordance with a 4:4:4 chroma format. Video post-processor 31 may be configured to perform one or more colour remapping processes 156 (which may be referred to as one or more CRI SEI message processes 156) on non-CRI processed decoded video data 155 in the order illustrated.

In another example, video decoder 30 and/or video post-processor 31 may be configured to process two or more CRI SEI messages in accordance with new semantics such that more than one CRI SEI message may be applied to the same decoded video data. Different example methods are disclosed as to how two more CRI SEI messages may be applied to the same decoded video data by video decoder 30 and/or video post-processor 31. In one example, video encoder 20 may be configured to signal multiple CRI SEI messages corresponding to the same video data (e.g., corresponding to the same picture), with each of such CRI SEI messages having a different value corresponding to the colour_remap_id syntax element. As used herein, colour_remap_id may refer to any syntax element having a corresponding value that that may be used to identify the purpose of information corresponding to a CRI SEI message (i.e., used to identify the purpose of the colour remapping information corresponding to the CRI SEI message). Video decoder 30 and/or video post-processor 31 may be configured to determine the value corresponding to the signaled colour_remap_id syntax element for each CRI SEI message corresponding to the same video data in accordance with the new semantics. For example, video decoder 30 and/or video post-processor 31 may be configured to determine the order in which the CRI SEI messages are to be applied to the decoded video data. As used herein, unless context dictates otherwise, reference to applying a process on or otherwise to decoded video data includes directly applying or indirectly applying the process on or otherwise to the decoded video data. Otherwise stated, reference herein to decoded video data does not imply, without further context, that the decoded video data has been or has not been processed since having been generated by, for example, video decoder 30. As an example, decoded video data may accurately describe the video data shown as being output from video decoder 30 as well as accurately describe the video data shown as being output from each process illustrated as being performed by video post-processor 31. The difference between the processes shown in FIG. 9 is that the decoded video data may change as a result of the one or more processes. For example, the decoded video data shown as being input into inverse quantization process 122 is decoded video data that has been processed by one or more CRI SEI message processes 156.

In some examples, the first value of colour_remap_id may be less than the second value of colour_remap_id. For example, video decoder 30 and/or video post processor 31 may be configured to determine that the CRI SEI message that has the lower value of colour_remap_id is applied to decoded video data before the application of any other CRI SEI message to the decoded samples that has a higher value of colour_remap_id. In another example, the colour remapping information of a CRI SEI message with a first value of colour_remap_id may be used to perform tone mapping of the components of the decoded video data to adjust the colour components of decoded video data (e.g., by performing a piecewise linear mapping of the colour components), and a colour remapping information of an SEI message with a second value of colour_remap_id may be used to map the decoded samples from a first dynamic range to a second dynamic range (e.g., HDR to SDR or vice versa).

In another example, video decoder 30 and/or video post-processor 31 may be configured to interpret the minimum and the maximum values permissible by the input and output bit-depth of the CRI SEI message (i.e., the bit-depth of the video data entering the CRI processing and the bit-depth of the video data leaving the CRI processing, respectively) when the format of the decoded video data corresponding to the CRI SEI message is floating point. In some examples, the minimum and the maximum values permissible by the input and output bit-depth of the SEI message may be interpreted by video decoder 30 and/or video post-processor 31 to be mapped to normalized floating point representations from 0 to 1, respectively. In other examples, when the permissible value range of the decoded video data in floating point is 0 to 1, the minimum and the maximum values represented by the respective input and output bit-depths may be mapped to 0 and 1, respectively.

Another example technique relates to the coding (i.e., encoding and/or decoding) of syntax elements related to pivot points. For example, video encoder 20 may be configured to signal syntax elements related to pivot points (e.g., pre_lut_coded_value[ ][ ], pre_lut_target_value[ ][ ], post_lut_coded_value[ ][ ], and post_lut_target_value[ ][ ]) with as many bits as indicated by the respective bit-depth of the decoded video data. For example, if video encoder 20 determines that the input and output bit-depths (indicated by colour_remap_input_bit_depth and colour_remap_bit_depth) are 12 and 10, respectively, then pre_lut_coded_value[ ][ ] may be coded by video encoder 20 with 12 bits; and pre_lut_target_value[ ][ ], post_lut_coded_value[ ][ ], and post_lut_target_value[ ][ ] are coded by encoder 20 with 10 bits.

In another example technique, video encoder 20 may be configured to signal a flag for pre- and post-LUTs to indicate to video decoder 30 and/or video post-processor 31 whether the pre- and post-LUTs indicated for the 0-th component (e.g., a first colour component of a colour space) are the same as pre- and post-LUTs to be applied to the other two components (e.g., the second and third colour components of the colour space). In this example, when the flag indicates that the pre- and post-LUTs applied for all the three components are identical, the pre- and post-LUT pivot points of only one component (e.g., one colour channel) are signaled by video encoder 20, and the pre- and post-LUT pivot points of the other components (e.g., other colour channels) may be inferred by video decoder 30 from the values of the 0-th component. For example, video decoder 30 may be configured to receive, in a bitstream, pivot points (which may also be referred to as LUT codewords) for a first pre-LUT (e.g., a first pre-LUT 206) and pivot points for a first post-LUT (e.g., a first post-LUT 210) for a first colour channel in a colour space. Video decoder 30 may also receive a value corresponding to a flag in the bitstream indicative of whether the first pre-LUT and the first post-LUT in this example corresponding to the 0-th component (i.e., the first colour channel in a three colour channel example) are the same as the pre- and post-LUTs for the second and third colour channels. Based on the value corresponding to the flag parsed from the bitstream, video decoder 30 may be configured to infer (e.g., determine) that the pivot points corresponding to the pre- and post-LUTs for the second and third colour channels are respectively the same for the first pre-LUT and the first post-LUT signaled by video encoder 20. It is therefore understood that video decoder 30 may be configured to perform the inverse of video encoder 20 to decode video data.

In other examples, video encoder 20 may be configured to signal a first flag for pre-LUTs, and may be configured to signal a second flag for post-LUTs for the above technique of not signaling the LUTs for more than one component, and for the inference of the LUTs from those of the 0-th component. In this example, the first flag (also referred to as the pre-LUT flag herein) may be signaled by video encoder 20 to indicate to video decoder 30 and/or video post-processor 31 whether the pre-LUT signaled for the 0-th component (e.g., a first colour component of a colour space) is the same as the pre-LUTs to be applied to the other two components (e.g., the second and third colour components of the colour space). In this example, when the first flag indicates that the pre-LUTs applied for all the three components are identical, the pre-LUT pivot points of only one component (e.g., one colour channel) are signaled by video encoder 20, and the pre-LUT pivot points of the other components (e.g., other colour channels) may be inferred by video decoder 30 from the values of the 0-th component.

Similarly, in this example, the second flag (also referred to as the post-LUT flag herein) may be signaled by video encoder 20 to indicate to video decoder 30 and/or video post-processor 31 whether the post-LUT signaled for the 0-th component (e.g., a first colour component of a colour space) is the same as the post-LUTs to be applied to the other two components (e.g., the second and third colour components of the colour space). In this example, when the first flag indicates that the post-LUTs applied for all the three components are identical, the post-LUT pivot points of only one component (e.g., one colour channel) are signaled by video encoder 20, and the post-LUT pivot points of the other components (e.g., other colour channels) may be inferred by video decoder 30 from the values of the 0-th component.

For example, when video encoder 20 determines that that the pre-LUTs applied for all colour components (e.g., red, green, and blue channels in the RGB colour space) are identical, video encoder 20 may be configured to signal a value corresponding to the pre-LUT flag indicative of this fact. When the value corresponding to the pre-LUT flag is signaled by video encoder 20 indicating pivot point sameness across each colour component, video encoder 20 may also be configured to only signal pre-LUT pivot points of only one component. Video decoder 30 may be configured to receive, in a bitstream, the value corresponding to pre-LUT flag, and pivot points corresponding to a single pre-LUT corresponding to a single colour component (e.g., the 0-th component). Based on the value corresponding to the pre-LUT flag parsed from the bitstream, video decoder 30 may be configured to infer (e.g., determine) that the pivot points corresponding to the remaining pre-LUTs (e.g., the pre-LUTS for which no pivot points were signaled) are the same as the pivot points corresponding to the single pre-LUT that was signaled by video encoder 20. Video encoder 20 and video decoder 30 operate in a similar manner with respect to the post-LUT flag, except that the post-LUT flag pertains to the sameness of post-LUT pivot points instead of the sameness of pre-LUT pivot points.

In other examples, video encoder 20 may be configured to signal a flag to indicate whether the LUT (e.g., pre-LUT or post-LUT) indicated for the 1st component (as opposed 0-th component) is the same as that to be applied to the 2nd component. In this example, the 1st and 2nd components are to be distinguished from the 0-th component (i.e., if the components were numbered from one instead of zero, this example would be described as including a flag that may be signaled to indicate whether the LUT (e.g., pre-LUT or post-LUT) indicated for the 2nd component is the same as that to be applied to the 3rd component). Video decoder 30 may receive a value corresponding to this flag in a bitstream, and determine (e.g., infer) that the pivot points corresponding to the pre- and post-LUTs corresponding to the 2nd component are the same as the pivot points signaled respectively for the pre- and post-LUTs for the 1st colour component.

In other examples, video encoder 20 may be configured to signal a flag for each colour component to indicate that the LUT components (i.e., the pre-LUT components and the post-LUT components) that apply to the current picture are to be inferred from the corresponding component of the CRI SEI message that applied to the previous picture in the output order. For example, video encoder 20 may be configured to signal six flags in a three colour component example. In such an example, a first flag may indicate that the pre-LUT that applies to the current picture corresponding to the first colour component is to be inferred from the pre-LUT corresponding to the first colour component of the CRI SEI message that applied to the previous picture in the output order. A second flag may indicate that the post-LUT that applies to the current picture corresponding to the first colour component is to be inferred from the post-LUT corresponding to the first colour component of the CRI SEI message that applied to the previous picture in the output order. A third flag may indicate that the pre-LUT that applies to the current picture corresponding to the second colour component is to be inferred from the pre-LUT corresponding to the second colour component of the CRI SEI message that applied to the previous picture in the output order. A fourth flag may indicate that the post-LUT that applies to the current picture corresponding to the second colour component is to be inferred from the post-LUT corresponding to the second colour component of the CRI SEI message that applied to the previous picture in the output order. A fifth flag may indicate that the pre-LUT that applies to the current picture corresponding to the third colour component is to be inferred from the pre-LUT corresponding to the third colour component of the CRI SEI message that applied to the previous picture in the output order. A sixth flag may indicate that the post-LUT that applies to the current picture corresponding to the third colour component is to be inferred from the post-LUT corresponding to the third colour component of the CRI SEI message that applied to the previous picture in the output order.

In another example technique, certain values corresponding to colour_remap_id may be reserved. For example, a first range of values corresponding to colour_remap_id may enable backward compatible processing chains (e.g. SDR, 709 container, etc.) and/or HDR processing chains. As another example, certain value ranges of the colour_remap_id may be reserved for backward compatible solutions (e.g. colour remapping information that can be used to process the content for display on an SDR display), or other backward compatible solutions including, for example, BT.709 colour container. In another example, certain value ranges of the colour_remap_id may be reserved for the HDR processing chain, where the final output will be displayed on an HDR display. Otherwise described, the examples above enable video encoder 20 to provide information to video decoder 30 to ensure that video decoder 30 and/or video post-processor 31 perform the requisite processing on the decoded video data to convert the decoded video data to SDR or HDR display compatible content. Referring to the examples above pertaining to certain reserved values, video encoder 20 may be configured to signal a value for the colour_remap_id syntax element in a CRI SEI message in a bitstream. Video decoder 30 may be configured to receive the bitstream and determine the value for the colour_remap_id corresponds to a reserved value indicating, for example, the CRI SEI message is to be applied in a backward compatible processing chain and/or an HDR processing chain. As another example, video decoder 30 may be configured to receive the bitstream and determine the value for the colour_remap_id corresponds to a reserved value indicating, for example, where in the decoding side processing chain each of the pre-LUT 206, 3×3 matrix 208, and post-LUT 210 is to be applied. For example, a value for the colour_remap_id may correspond to the processing chain depicted in FIG. 10, FIG. 11, FIG. 12, FIG. 13, or FIG. 14.

In another example technique, video encoder 20 may be configured to signal pivot points for a pre-LUT and/or a post-LUT as described herein. In some examples, the pivot points may not cover the entire input range that corresponds to the decoded video data. In such examples, video decoder 30 and/or video post-processor 31 may be configured to map any decoded video data having a colour component value that is less than the first pivot point in the pre- and/or post-LUT to the first pivot point in the pre- and/or post LUT. Similarly, video decoder 30 and/or video post-processor 31 may be configured to map any decoded video data having a colour component value that is more than the last pivot point in the pre- and/or post-LUT to the first pivot point in the pre- and/or post LUT.

One or more example techniques described herein may also be described relative to changes to the syntax of the CRI SEI message defined by the current HEVC standard and/or changes to semantics of the CRI SEI message defined by the current HEVC standard. Additions to the syntax and semantics relative to the current HEVC standard are underlined, and text removed is indicated by strikethrough.

Changes to the syntax of the CRI SEI message include (with additions represented by underlined text and deletions represented by stricken text):

```
    colour_remap_bit_depth                              u(8)
    prelutnumcomps                                      ue(v)
    for( c = 0; c < 3 pre_lut_num_comps; c++ ) {
        pre_lut_num_val_minus1[ c ]                     u(8)
        if( pre_lut_num_val_minus1[ c ] > 0 )
            for( i = 0; i <= pre_lut_num_val_minus1[ c ]; i++ ) {
                pre_lut_coded_value[ c ][ i ]           u(v)
                pre_lut_target_value[ c ][ i ]          u(v)
            }
    }
    colour_remap_matrix_present_flag                    u(1)
```

Changes to the semantics of the CRI SEI message are shown in paragraphs below (with additions represented by underlined text and deletions represented by stricken text).

The colour remapping information SEI message provides information to enable remapping of the reconstructed colour samples of the output pictures. The colour remapping information may be applied directly to the decoded sample values, regardless of whether they are in the luma and chroma domain or the RGB domain. The colour remapping information may also be applied to the decoded samples after the application of one or more processes. The colour remapping model used in the colour remapping information SEI message is composed of a first piece-wise linear function applied to each colour component (specified by the "pre" set of syntax elements herein), a three by-three matrix applied to the three colour components, and a second piece-wise linear function applied to each colour component (specified by the "post" set of syntax elements herein). NOTE 1—Colour remapping of the output pictures for the display is optional and does not affect the decoding process specified in this Specification.

colour_remap_id contains an identifying number that may be used to identify the purpose of the colour remapping information. The value of colour_remap_id shall be in the range of 0 to $2^{32}-2$, inclusive.

Values of colour_remap_id from 0 to 255 and from 512 to $2^{31}-1$ may be used as determined by the application. Values of colour_remap_id from 256 to 511, inclusive, and from $2^{31}$ to $2^{32}-2$, inclusive are reserved for future use by ITU-T ISO/IEC. Decoders shall ignore all colour remapping information SEI messages containing a value of colour_remap_id in the range of 256 to 511, inclusive, or in the range of $2^{31}$ to $2^{32}-2$, inclusive, and bitstreams shall not contain such values. NOTE 2—The colour_remap_id can be used to support different colour remapping processes that are suitable for different display scenarios. For example, different values of colour_remap_id may correspond to different remapped colour spaces supported by displays.

When more than one SEI message is associated with the current picture, and each such SEI message has a different value of colour_remap_id, the colour remapping information of one SEI message is applied after the application of colour remapping information of another SEI message. The order in which the SEI messages are to be applied may be determined by the application. When not specified, the colour remapping information is applied in increasing order of colour_remap_id of the colour remapping information SEI messages associated with the current picture.

colour_remap_matrix_coefficients has the same semantics as specified in clause E.3.1 for the matrix_coeffs syntax element, except that colour_remap_matrix_coefficients specifies the colour space of the remapped reconstructed picture, rather than the colour space used for the CLVS. When not present, the value of colour_remap_matrix_coefficients is inferred to be equal to the value of matrix_coeffs.

colour_remap_input_bit_depth specifies the bit depth of the luma and chroma components or the RGB components of the associated pictures for purposes of interpretation of the colour remapping information SEI message. When any colour remapping information SEI messages is present with the value of colour_remap_input_bit_depth not equal to the bit depth of the coded luma and chroma components or that of the coded RGB components, the SEI message refers to the hypothetical result of a transcoding operation performed to convert the coded video to a converted video with bit depth equal to colour_remap_input_bit_depth. When the colour remapping information is applied to luma or chroma components, or RGB components, in floating point representation in the range 0 to 1, the SEI message refers to the hypothetical result of quantizing the floating point representation to convert it to a representation with bit depth equal to colour_remap_input_bit_depth.

The value of colour_remap_input_bit_depth shall be in the range of 8 to 16, inclusive. Values of colour_remap_input_bit_depth from 0 to 7, inclusive, and from 17 to 255, inclusive, are reserved for future use by ITU-T|ISO/IEC. Decoders shall ignore all colour remapping SEI messages that contain a colour_remap_input_bit_depth in the range of 0 to 7, inclusive, or in the range of 17 to 255, inclusive, and bitstreams shall not contain such values.

pre_lut_num_comps specifies the number of components for which the pivot points corresponding to the pre-look-up table are explicitly signaled in the colour remapping information message. The value of pre_lut_num_comps shall be in the range 0 to 3, inclusive.

colour_remap_bit_depth specifies the bit depth of the output of the colour remapping function described by the colour remapping information SEI message.

The value of colour_remap_bit_depth shall be in the range of 8 to 16, inclusive. Values of colour_remap_bit_depth from 0 to 7, inclusive, and in the range of 17 to 255, inclusive, are reserved for future use by ITU-T|ISO/IEC. Decoders shall ignore all colour remapping SEI messages that contain a value of colour_remap_bit_depth from 0 to 7, inclusive, or in the range of 17 to 255, inclusive.

pre_lut_num_val_minus1[c] plus 1 specifies the number of pivot points in the piece-wise linear remapping function for the c-th component, where c equal to 0 refers to the luma or G component, c equal to 1 refers to the Cb or B component, and c equal to 2 refers to the Cr or R component. When pre_lut_num_val_minus1[c] is equal to 0, the default end points of the input values are 0 and $2^{colour\_remap\_input\_bit\_depth}-1$, and the corresponding default end points of the output values are 0 and $2^{colour\_remap\_bit\_depth}-1$, for the c-th component. In bitstreams conforming to this version of this Specification, the value of pre_lut_num_val_minus1[c] shall be in the range of 0 to 32, inclusive.

When pre_lut_num_val_minus1[c] is not present in the colour remapping information SEI message for c in the range of 1 to 2, inclusive, the value of pre_lut_num_val_minus1[c] is set equal to pre_lut_num_val_minus1[c−1].

prelut_coded_value[c][i] specifies the value of the i-th pivot point for the c-th component. The number of bits used to represent pre_lut_coded_value[c][i] is colour_remap_input_bit_depth.

When pre_lut_coded_value[c][i] is not present in the colour remapping information SEI message for c in the range of 1 to 2, and i is less than or equal to pre_lut_num_val_minus1[c], inclusive, the value of pre_lut_coded_value[c][i] is set equal to pre_lut_coded_value[c−1][i].

pre_lut_target_value[c][i] specifies the value of the i-th pivot point for the c-th component. The number of bits used to represent pre_lut_target_value[c][i] is colour_remap_bit_depth.

When pre_lut_target_value[c][i] is not present in the colour remapping information SEI message for c in the range of 1 to 2, and i is less than or equal to pre_lut_num_val_minus1[c], inclusive, the value of pre_lut_target_value[c][i] is set equal to pre_lut_target_value[c−1][i].

When the range of input data of component c is in the range of minValue to maxValue, inclusive, then the following applies:

When minValue is less than pre_lut_coded_value[c][0], all input values that are in the range minValue to pre_lut_coded_value[c][0]−1, inclusive are mapped to pre_lut_target_value[c][0].

When maxValue is greater than pre_lut_coded_value[c][pre_lut_num_val_minus1[c]], all input values that are in the range pre_lut_coded_value[c][pre_lut_num_val_minus[c]]+1 to maxValue, inclusive are mapped to pre_lut_target_value[c][pre_lut_num_val_minus[c]].

The semantics of post_lut_num_val_minus[ ], post_lut_coded_value[ ][ ], and post_lut_target_value[ ][ ] are similar to the semantics of pre_lut_num_val_minus[ ], pre_lut_coded_value[ ][ ], and pre_lut_target_value[ ][ ], respectively; the number of bits used to represent post_lut_coded_value[ ][ ], and post_lut_target_value[ ][ ] is equal to colour_remap_bit_depth.

In one example, the range of input data may refer to the permitted values of the components which could be standard range (e.g. 16-235 for 8-bit content for luma, 16 to 240 for 8-bit content for chroma) or restricted range (e.g. 4-1020 for 10-bit content for both luma and chroma). In another example, the input values that are out of range of those points indicated by the input pivot points may be mapped to default values that are signaled explicitly or fixed to some value. Similar changes may be made to the semantics related to the post-LUT.

As an alternative to the semantics addition shown in paragraph, the application of more than one CRI message may be specified as follows: an additional syntax element may be added that determines whether the colour remapping information from more than one CRI SEI message may be applied to the current picture. When the value of this additional syntax element is one, colour remapping information of more than one CRI SEI message may be applied to the current picture. When the value of the syntax element is equal to zero, the colour remapping information of only one SEI message may be applied to the current picture. When there is more than one CRI SEI message associated with the current picture that have the value of syntax element equal to zero, then the colour remapping information of the CRI SEI message with the lowest colour_remap_id may be applied. In other examples, when there is more than one CRI SEI message associated with the current picture, the colour remapping information of the CRI SEI message with the lowest colour_remap_id may be applied.

This disclosure provides several examples of implementation configurations that may be used to apply one or more features described herein. For example, several example configurations are illustrated to depict examples of how colour remapping information described herein may be used in the post-processing chain (i.e., the post-decoding chain). This disclosure is not limited to the examples set forth herein.

In some examples, a particular value of colour_remap_id may be assigned to each configuration (e.g. each post-processing chain configuration illustrated in FIGS. 9-14), which could be used to indicate the required processing at the decoder-end. In each of the example post-decoding configurations illustrated in FIGS. 10-14, the three CRI processes (e.g., pre-LUT 206, 3×3 matrix 208, and post-LUT 210) are depicted. Underlined CRI processes indicate that the values may be non-trivial (non-identity) while the non-underlined CRI processes indicate that the CRI process is effectively not used or otherwise performed by video post-processor 31 by, for example, using default values/identity mapping instead of signaled values. For example, video encoder 20 may be configured to signal information indicative that 3×3 matrix 208 is an identity matrix. As another example, video encoder 20 may be configured to signal information indicative that pre-LUT 206 may be a data structure that maps input pixel values to output pixel values such that the output values equal the input values (i.e., input pixel values do not change upon being mapped by pre-LUT 206, which may be referred to as an identity mapping). As another example, video encoder 20 may be configured to signal information indicative that post-LUT 210 may be a data structure that maps input pixel values to output pixel values such that the output values equal the input values (i.e., input pixel values do not change upon being mapped by post-LUT 210, which may be referred to as an identity mapping).

Figure 10:
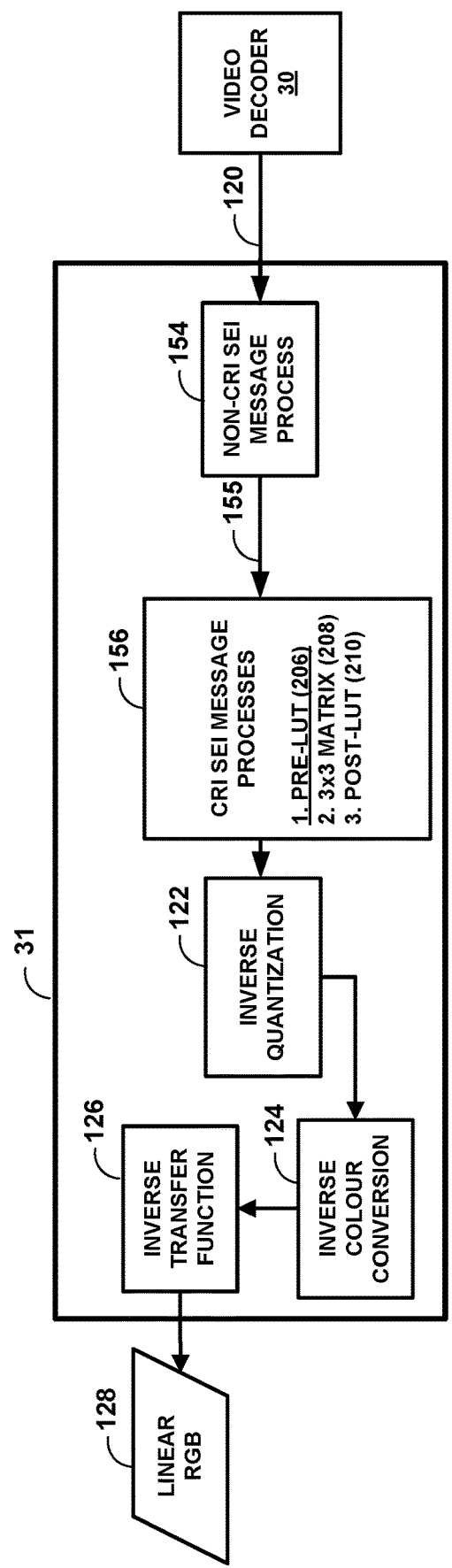
FIG. 10 illustrates one example of a post-decoding chain configuration in accordance with one or more techniques of this disclosure.

FIG. 10 illustrates one example of a post-decoding chain configuration in accordance with one or more techniques of this disclosure. In the example of FIG. 10, only the pre-LUT is used by video post-processor 31 to modify the decoded video data. The configuration illustrated in FIG. 10 may be used when performing dynamic range adjustment of the luma and/or chroma components in, for example, the YUV domain.

Figure 11:
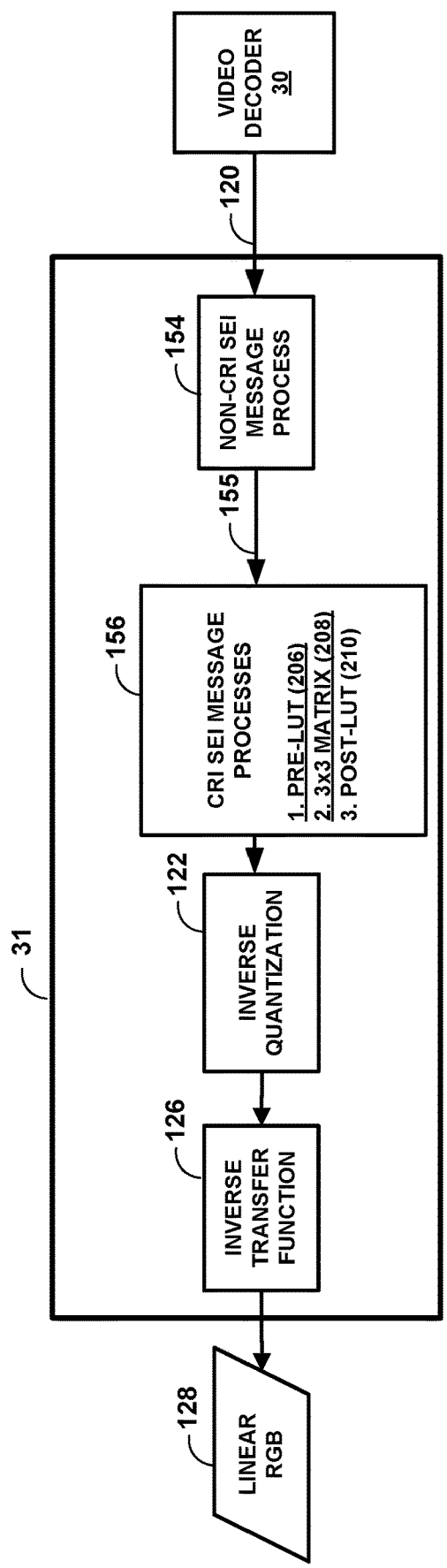
FIG. 11 illustrates one example of a post-decoding chain configuration in accordance with one or more techniques of this disclosure.

FIG. 11 illustrates one example of a post-decoding chain configuration in accordance with one or more techniques of this disclosure. FIG. 11 shows one example configuration in which 3×3 matrix 202 in the colour remapping information could be used by video post-processor 31 to perform a colour space conversion (e.g., YUV pixel data to RGB pixel data).

Figure 12:
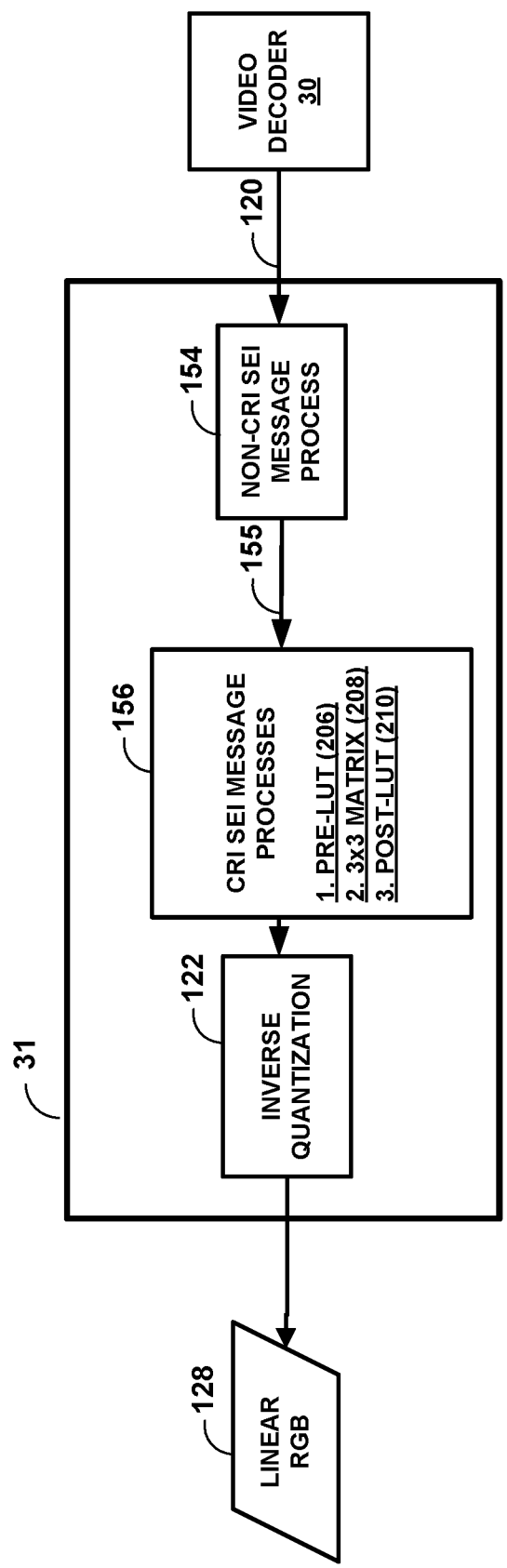
FIG. 12 illustrates one example of a post-decoding chain configuration in accordance with one or more techniques of this disclosure.

FIG. 12 illustrates one example of a post-decoding chain configuration in accordance with one or more techniques of this disclosure. FIG. 12 shows one example configuration in which the three parts of the colour remapping information (e.g., pre-LUT 206, 3×3 matrix 208, and post-LUT 210) could be used by video post-processor 31 to perform a colour space conversion (e.g., YUV pixel data to RGB pixel data).

Figure 13:
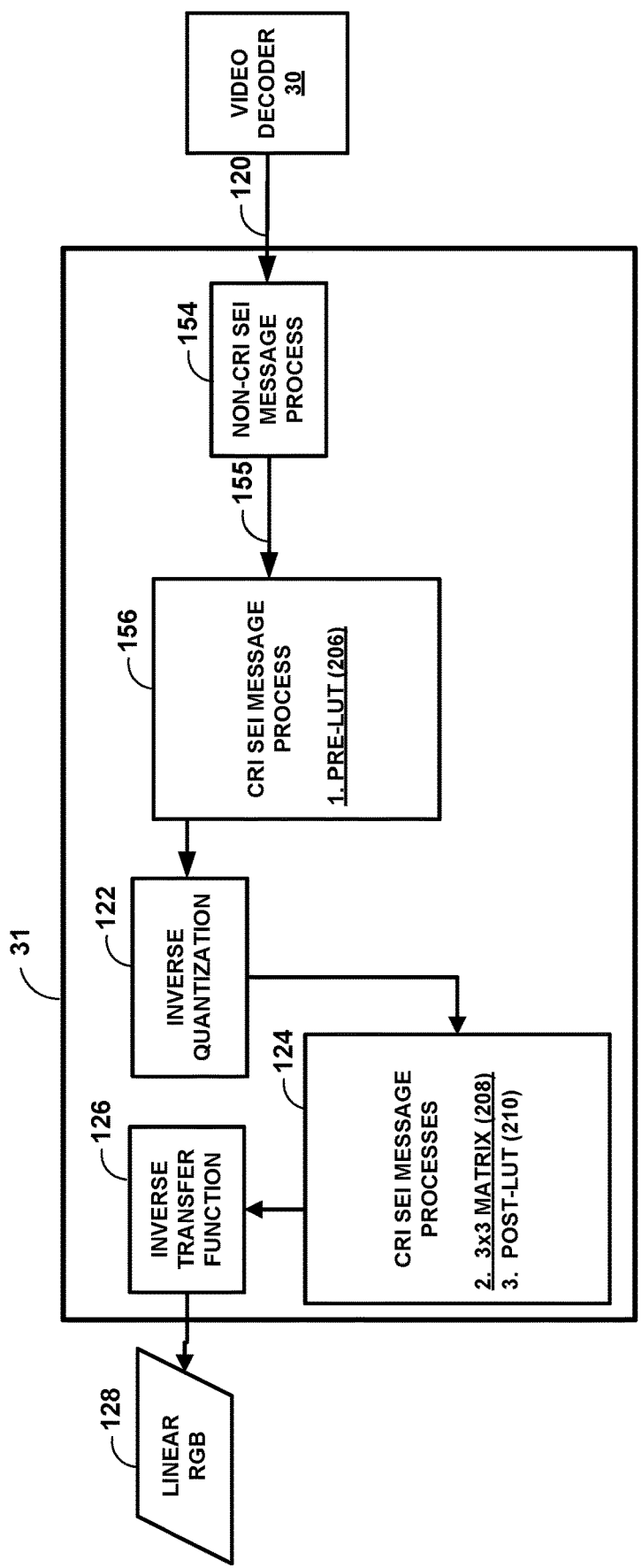
FIG. 13 illustrates one example of a post-decoding chain configuration in accordance with one or more techniques of this disclosure.

FIG. 13 illustrates one example of a post-decoding chain configuration in accordance with one or more techniques of this disclosure. FIG. 13 shows how the CRI SEI processes may not only be applied successively (e.g., in the manner shown in the examples of FIGS. 10-12, for example). FIG. 13 also shows that CRI SEI processes (3×3 matrix 208 and post-LUT 210 in this example) may be applied on components (e.g., decoded video data) in floating point domain because, as shown herein, decoded video data output by inverse quantization process 122 may be in floating point representation, and data input into inverse quantization process 122 may be in fixed point representation. Implicit quantization and de-quantization may be performed to convert from float to fixed point and fixed to floating point, respectively, such that the 3×3 matrix and post-LUT operations can be applied accordingly.

Figure 14:
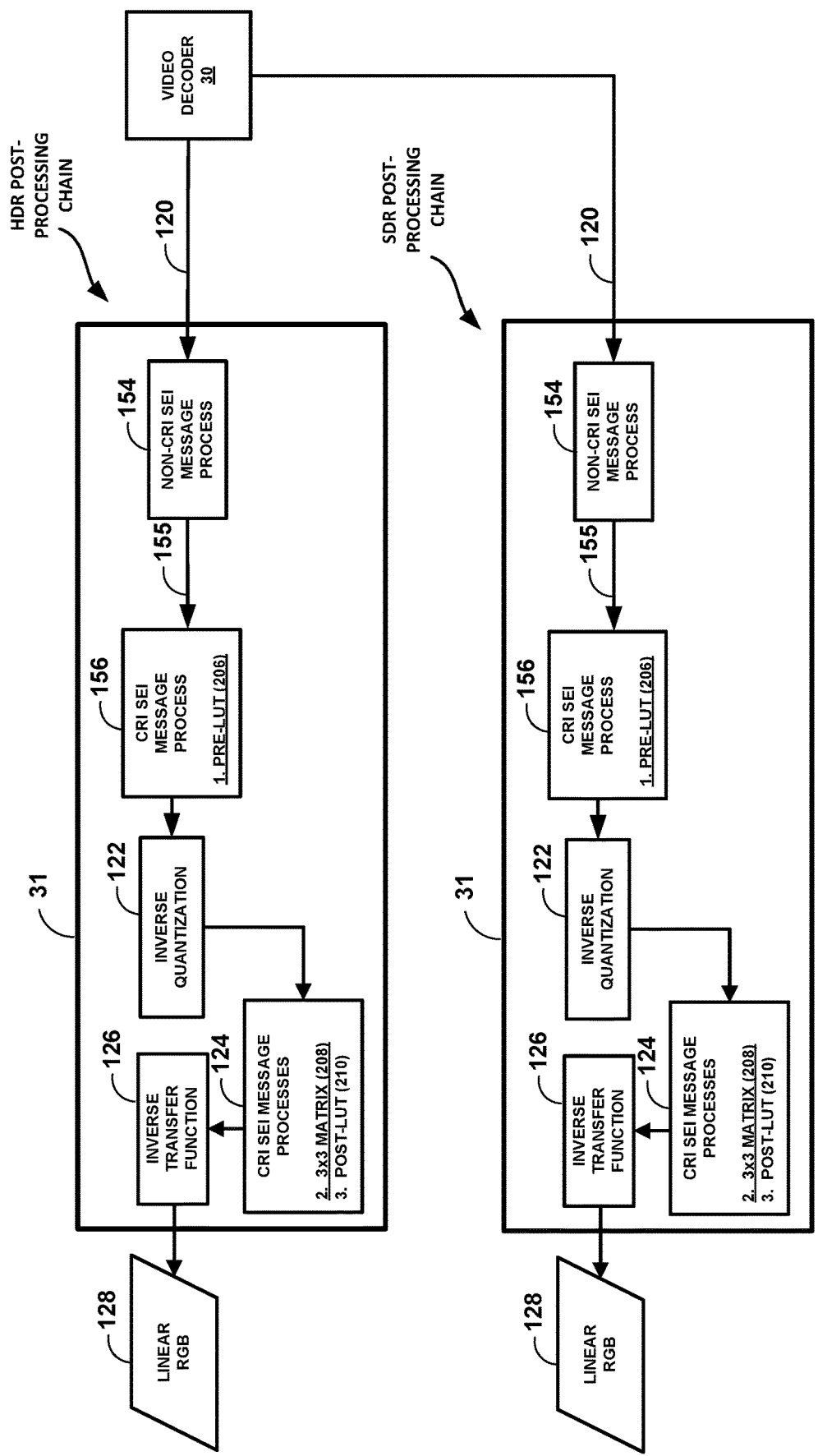
FIG. 14 illustrates one example of two post-decoding chain configurations in accordance with one or more techniques of this disclosure.

FIG. 14 illustrates one example of two post-decoding chain configurations in accordance with one or more techniques of this disclosure. FIG. 14 shows that two sets of colour remapping information could be signaled to apply to an HDR post-processing chain and an SDR post processing chain. Otherwise described, FIG. 14 illustrates that video encoder 20 may be configured to generate a plurality of CRI SEI messages corresponding to the same video data (e.g., picture), and that video post-processor 31 may be configured to use information corresponding to at least a first CRI SEI message of the plurality of CRI SEI messages to process the decoded video data in an HDR chain and use information corresponding to at least a second CRI SEI message of the plurality of CRI SEI messages to process the decoded video data in an SDR chain. The tone-mapping information, conveyed by the LUTs are typically different for the SDR and HDR chains. In some examples, the colour remapping information may be signaled in two CRI SEI messages, with two different IDs (e.g., a first colour_remap_id and a second colour_remap_id). One ID may indicate HDR processing, and the other ID may indicate SDR processing. Each decoding chain (SDR/HDR) may use the respective colour remapping information corresponding to the CRI SEI message corresponding thereto.

Figure 15:
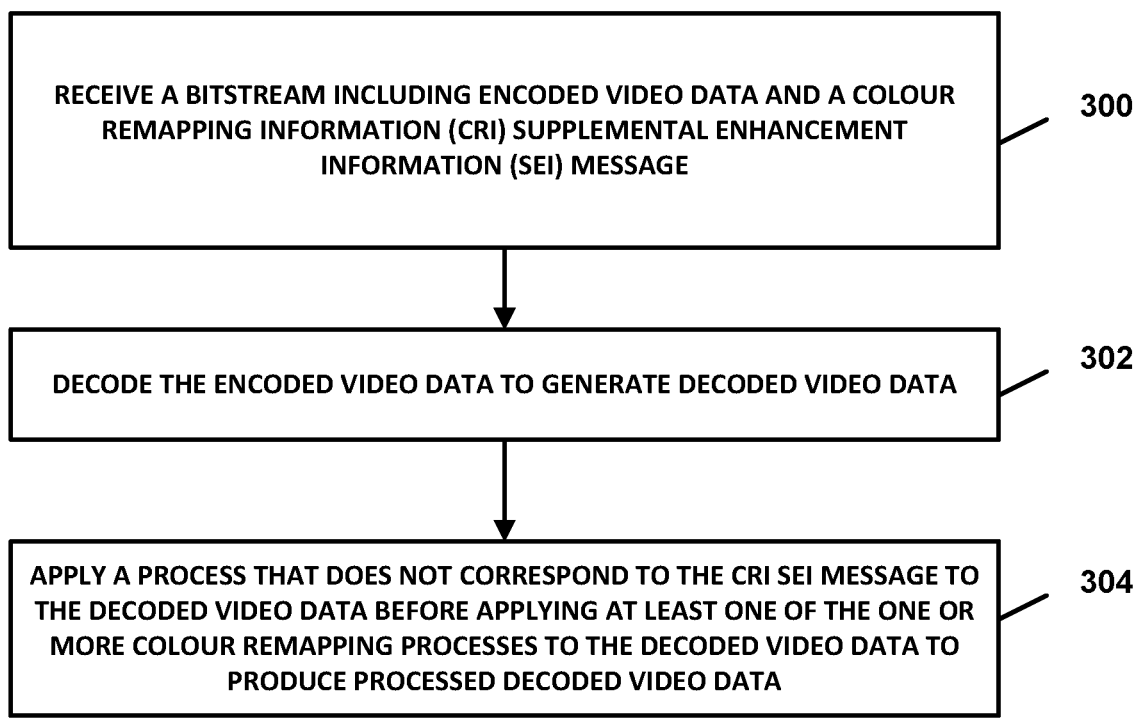
FIG. 15 is a flowchart illustrating an example process according to the techniques of this disclosure.

FIG. 15 is a flowchart illustrating an example process according to the techniques of this disclosure. The techniques of FIG. 15 may be executed by destination device 14 of FIG. 1, including by one or more of video decoder 30 and/or video post-processor 31.

In one example of the disclosure, video decoder 30 may be configured to receive a bitstream including encoded video data and a colour remapping information (CRI) supplemental enhancement information (SEI) message (300). In some examples, the CRI SEI message may include information corresponding to one or more colour remapping processes. Video decoder 30 may be configured to decode the encoded video data to generate decoded video data (302). Video decoder 30 and/or video post-processor 31 may be configured to apply a process that does not correspond to the CRI SEI message to the decoded video data before applying at least one of the one or more colour remapping processes to the decoded video data to produce processed decoded video data (304).

In some examples, video decoder 30 and/or video post-processor 31 may be configured to apply at least one of the one or more colour remapping processes to the processed decoded video data. In such examples, the process that does not correspond to the CRI SEI message may include at least one of: an upsampling process, a downsampling process; a colour space conversion process; an inverse quantization process; or a change of colour primaries used to represent components of the decoded video data.

In some examples, video decoder 30 and/or video post-processor 31 may be configured to receive, as part of the CRI SEI message, a value corresponding to a syntax element indicative of (1) whether the processed decoded video data, with or without additional processing, is compatible for presentment by a Standard Dynamic Range (SDR) display or a High Dynamic Range (HDR) display, (2) whether the one or more colour remapping processes corresponding to the CRI SEI message are configured such that an input and an output respectively corresponding to each colour remapping process of the one or more colour remapping processes are equal (e.g., whether an input and output corresponding to a first colour remapping process are equal, whether an input and output corresponding to a second colour remapping process are equal, and the like), (3) or whether the process that does not correspond to the CRI SEI message is to be applied between two colour remapping processes corresponding to the CRI SEI message. In some examples, video post-processor 31 may be configured to map SDR compatible decoded video data to HDR compatible decoded video data. In other examples, video post-processor 31 may be configured to map HDR compatible decoded video data to SDR compatible decoded video data.

In some examples, the CRI SEI message may be a first CRI SEI message and video decoder 30 may be configured to receive, in the bitstream, the first CRI SEI message and a second CRI SEI message that both correspond to the same decoded video data. For example, the decoded video data may include one or more decoded pictures (e.g., a first decoded picture, a second decoded picture, and the like). In such an example, the same decoded video data may refer to the same decoded picture. As another example, the decoded video data may include first decoded video data (e.g., a first decoded picture) and second decoded video data (a second decoded picture). In such an example, both the first and second CRI SEI messages may both correspond to the first decoded video data, or both the first and second CRI SEI messages may both correspond to the second decoded video data.

The second CRI SEI message may include information corresponding to one or more colour remapping processes. The first CRI SEI message may include a first identification value and the second CRI SEI message may include a second identification value. Video decoder 30 and/or video post-processor 31 may be configured to determine, based on the first identification value and the second identification value, an order in which to apply the one or more colour remapping processes corresponding to the first CRI SEI message or the second CRI SEI message to the processed decoded video data.

In some examples, video decoder 30 and/or video post-processor 31 may be configured to perform, based on determining the order based on the first identification value and the second identification value, at least one of: (1) applying, to the processed decoded video data, each of the one or more colour remapping processes corresponding to the first CRI SEI message to generate colour remapped decoded video data, and then applying each of the one or more colour remapping processes corresponding to the second CRI SEI message to the colour remapped decoded video data; or (2) applying, to the processed decoded video data, each of the one or more colour remapping processes corresponding to the second CRI SEI message to generate colour remapped decoded video data, and then applying each of the one or more colour remapping processes corresponding to the first CRI SEI message to the colour remapped decoded video data.

Figure 16:
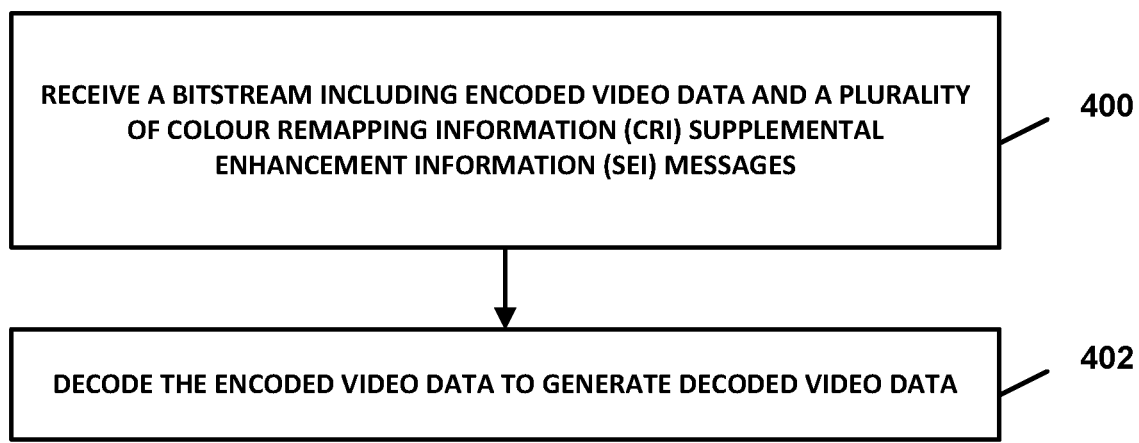
FIG. 16 is a flowchart illustrating an example process according to the techniques of this disclosure.

FIG. 16 is a flowchart illustrating an example process according to the techniques of this disclosure. The techniques of FIG. 16 may be executed by destination device 14 of FIG. 1, including by one or more of video decoder 30 and/or video post-processor 31.

In one example of the disclosure, video decoder 30 may be configured to receive a bitstream including encoded video data and a plurality of colour remapping information (CRI) supplemental enhancement information (SEI) messages (400). Each CRI SEI message of the plurality of CRI SEI messages may include information corresponding to one or more colour remapping processes (e.g., a first CRI SEI message may include information corresponding to one or more colour remapping processes and a second CRI SEI message may include information corresponding to one or more colour remapping processes that are different from the one or more colour remapping processes corresponding to the first CRI SEI message). The plurality of CRI SEI messages may include a first CRI SEI message and a second CRI SEI message. Video decoder 30 may be configured to decode the encoded video data to generate decoded video data (402). The plurality of CRI SEI messages may correspond to the same decoded video data. For example, the decoded video data may include one or more decoded pictures (e.g., a first decoded picture, a second decoded picture, and the like). In such an example, the same decoded video data may refer to the same decoded picture. As another example, the decoded video data may include first decoded video data (e.g., a first decoded picture) and second decoded video data (a second decoded picture). In such an example, both the first and second CRI SEI messages may both correspond to the first decoded video data, or both the first and second CRI SEI messages may both correspond to the second decoded video data.

The first CRI SEI message may include a first identification value and the second CRI SEI message may include a second identification value. Video decoder 30 and/or video post-processor 31 may be configured to determine, based on the first identification value and the second identification value, an order in which to apply the one or more colour remapping processes corresponding to the first CRI SEI message or the second CRI SEI message to the processed decoded video data.

In some examples, video decoder 30 and/or video post-processor 31 may be configured to perform, based on determining the order based on the first identification value and the second identification value, at least one of: (1) applying, to the processed decoded video data, each of the one or more colour remapping processes corresponding to the first CRI SEI message to generate colour remapped decoded video data, and then applying each of the one or more colour remapping processes corresponding to the second CRI SEI message to the colour remapped decoded video data; or (2) applying, to the processed decoded video data, each of the one or more colour remapping processes corresponding to the second CRI SEI message to generate colour remapped decoded video data, and then applying each of the one or more colour remapping processes corresponding to the first CRI SEI message to the colour remapped decoded video data.

In some examples, video decoder 30 and/or video post-processor 31 may be configured to receive, as part of each CRI SEI message of the plurality of CRI SEI messages, a value corresponding to a syntax element indicative of (1) whether the processed decoded video data, with or without additional processing, is compatible for presentment by a Standard Dynamic Range (SDR) display or a High Dynamic Range (HDR) display, (2) whether the one or more colour remapping processes corresponding to the respective CRI SEI message are configured such that an input and an output respectively corresponding to each colour remapping process of the one or more colour remapping processes corresponding to the respective CRI SEI message are equal (e.g., whether an input and output corresponding to a first colour remapping process of the respective CRI SEI message are equal, whether an input and output corresponding to a second colour remapping process of the respective CRI SEI message are equal, and the like), (3) or whether a process that does not correspond to the respective CRI SEI message is to be applied between two colour remapping processes corresponding to the respective CRI SEI message. In some examples, video post-processor 31 may be configured to map SDR compatible decoded video data to HDR compatible decoded video data. In other examples, video post-processor 31 may be configured to map HDR compatible decoded video data to SDR compatible decoded video data.

Figure 17:
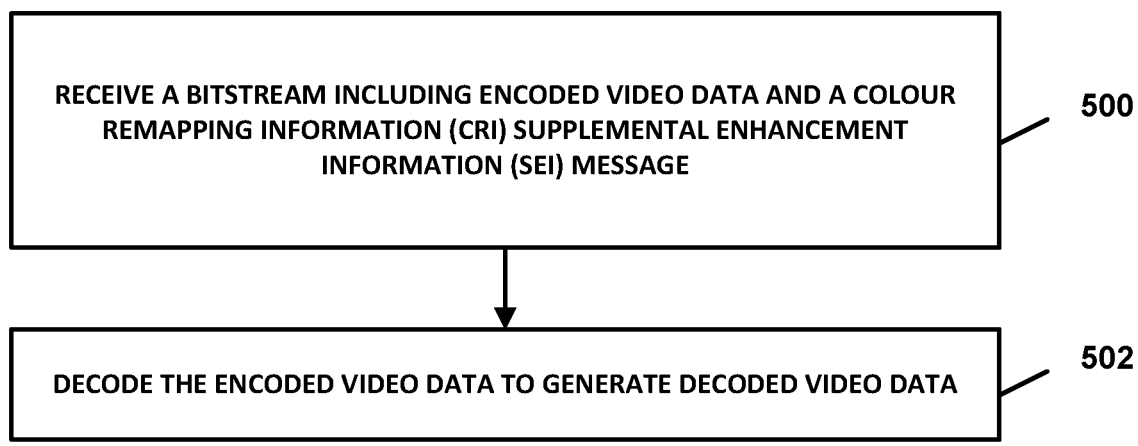
FIG. 17 is a flowchart illustrating an example process according to the techniques of this disclosure.

FIG. 17 is a flowchart illustrating an example process according to the techniques of this disclosure. The techniques of FIG. 17 may be executed by destination device 14 of FIG. 1, including by one or more of video decoder 30 and/or video post-processor 31.

In one example of the disclosure, video decoder 30 may be configured to receive a bitstream including encoded video data and a colour remapping information (CRI) supplemental enhancement information (SEI) message (500). The CRI SEI message may include information corresponding to one or more colour remapping processes and a value corresponding to a syntax element. Video decoder 30 may be configured to decode the encoded video data to generate decoded video data (502). In some examples, the value corresponding to the syntax element is indicative of: (1) whether the decoded video data, with or without additional processing, is compatible for presentment by a Standard Dynamic Range (SDR) display or a High Dynamic Range (HDR) display, (2) whether the one or more colour remapping processes corresponding to the CRI SEI message are configured such that an input and an output respectively corresponding to each colour remapping process of the one or more colour remapping processes are equal, or (3) whether a process that does not correspond to the CRI SEI message is to be applied between two colour remapping processes corresponding to the CRI SEI message.

In some examples, video decoder 30 and/or video post-processor 31 may be configured to apply, based on the value corresponding to the syntax element, at least one of the one or more colour remapping processes to the decoded video data to produce processed decoded video data.

The various examples described herein may be combined in any combination. Similarly, any example described herein including two or more features (e.g., steps, components, or the like) is also understood as including one or more less features in other examples. As an example, with respect to the example of FIG. 15, video decoder 30 and/or video post-processor 31 may be configured to apply a process that does not correspond to the CRI SEI message to the decoded video data before applying at least one of the one or more colour remapping processes to the decoded video data to produce processed decoded video data (304). However, it is understood that in other examples, video decoder 30 and/or video post-processor 31 may be configured to apply at least one of the one or more colour remapping processes to the decoded video data. Otherwise described, in some examples, video decoder 30 and/or video post-processor 31 may be configured to perform one or more colour remapping processes directly or indirectly on decoded video data. It therefore also understood that the CRI SEI message described with respect to FIG. 15 may be a first CRI SEI message and video decoder 30 may be configured to receive, in the bitstream, the first CRI SEI message and a second CRI SEI message that both correspond to the same decoded video data. Video decoder 30 may be configured to receive the first CRI SEI message and the second CRI SEI message in the example where video decoder 30 and/or video post-processor 31 may be configured to perform one or more colour remapping processes directly on the decoded video data, or in the example where video decoder 30 and/or video post-processor 31 may be configured to perform one or more colour remapping processes indirectly on the decoded video data.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing video data, the method comprising:
   receiving a bitstream including encoded video data, a first colour remapping information (CRI) supplemental enhancement information (SEI) message including a first colour remapping identification value (colour_remap_id), and a second CRI SEI message including a second colour remapping identification value (colour_remap_id), wherein the first CRI SEI message and the second CRI SEI message are associated with the same picture of the encoded video data, wherein the first CRI SEI message includes information corresponding to a first one or more colour remapping processes, and wherein the second CRI SEI message includes information corresponding to a second one or more colour remapping processes different from the first one or more colour remapping processes;
   determining, based on the first identification value (colour_remap_id) and the second identification value (colour_remap_id), an order in which to apply, on the same picture of the encoded video data, the first one or more colour remapping processes corresponding to the information included in the first CRI SEI message and the second one or more colour remapping processes corresponding to the information included in the second CRI SEI message;
decoding the encoded video data to generate decoded video data;
prior to applying any colour remapping process of the first or second one or more colour remapping processes, applying an upsampling process to the decoded video data to produce processed decoded video data; and
applying, to the processed decoded video data, after applying the upsampling process to the decoded video data, at least one colour remapping process of the first one or more colour remapping processes corresponding to the information included in the first CRI SEI message and at least one colour remapping process of the second one or more colour remapping processes corresponding to the information included in the second CRI SEI message in the determined order.

2. The method of claim 1, wherein the first CRI SEI message does not include information corresponding to any of: (i) the upsampling process, (ii) a downsampling process, (iii) a colour space conversion process, (iv) an inverse quantization process, and (v) a change of colour primaries used to represent components of the decoded video data.

3. The method of claim 1, further comprising:
receiving, as part of the first CRI SEI message, a value corresponding to a syntax element indicative of:
whether the processed decoded video data is compatible for presentment by a Standard Dynamic Range (SDR) display or a High Dynamic Range (HDR) display,
whether the first one or more colour remapping processes corresponding to the information included in the first CRI SEI message are configured such that an input and an output respectively corresponding to each respective colour remapping process of the first one or more colour remapping processes are equal, or
whether the at least one of: (i) the upsampling process, (ii) a downsampling process, (iii) a colour space conversion process, (iv) an inverse quantization process, or (v) a change of colour primaries used to represent components of the decoded video data is to be applied between applications of two colour remapping processes of the first one or more colour remapping processes corresponding to the information included in the first CRI SEI message.

4. A device configured to process video data, the device comprising:
an interface configured to receive a bitstream including encoded video data;
a memory in communication with the interface, the memory being configured to store the encoded video data; and
one or more processors in communication with the memory, the one or more processors being configured to:
process a first colour remapping information (CRI) supplemental enhancement information (SEI) message of the encoded video data stored to the memory, the first CRI SEI message including a first colour remapping identification value (colour_remap_id), and a second CRI SEI message including a second colour remapping identification value (colour_remap_id),
wherein the first CRI SEI message and the second CRI SEI message are associated with the same picture of the encoded video data, wherein the first CRI SEI message includes information corresponding to a first one or more colour remapping processes;
process a second CRI SEI message including a second colour remapping identification value (colour_remap_id), wherein the second CRI SEI message corresponds to a portion of the encoded video data stored to the memory that also corresponds to the first CRI SEI message, and wherein the second CRI SEI message includes information corresponding to a second one or more colour remapping processes different from the first one or more colour remapping processes;
determine, based on the first identification value (colour_remap_id) and the second identification value (colour_remap_id), an order in which to apply, on the same picture of the encoded video data, the first one or more colour remapping processes corresponding to the information included in the first CRI SEI message and the second one or more colour remapping processes corresponding to the information included in the second CRI SEI message;
decode the encoded video data to generate decoded video data;
prior to application of any colour remapping process of the first or second one or more colour remapping processes, apply an upsampling process to the decoded video data to produce processed decoded video data; and
after the application of the upsampling process to the decoded video data, apply, to the processed decoded video data, at least one colour remapping process of the first one or more colour remapping processes corresponding to the information included in the first CRI SEI message and at least one colour remapping process of the second one or more colour remapping processes corresponding to the information included in the second CRI SEI message in the determined order.

5. The device of claim 4, wherein the first CRI SEI message does not include information corresponding to any of: (i) the upsampling process, (ii) a downsampling process, (iii) a colour space conversion process, (iv) an inverse quantization process, and (v) a change of colour primaries used to represent components of the decoded video data.

6. The device of claim 4, wherein the one or more processors are further configured to:
receive, as part of the first CRI SEI message, a value corresponding to a syntax element indicative of:
whether the processed decoded video data is compatible for presentment by a Standard Dynamic Range (SDR) display or a High Dynamic Range (HDR) display,
whether the first one or more colour remapping processes corresponding to the information included in the first CRI SEI message are configured such that an input and an output respectively corresponding to each colour remapping process of the first one or more colour remapping processes are equal, or
whether the at least one of: (i) the upsampling process, (ii) a downsampling process, (iii) a colour space conversion process, (iv) an inverse quantization process, or (v) a change of colour primaries used to represent components of the decoded video data is to be applied between applications of two colour remapping processes of the first one or more colour remapping processes corresponding to the information included in the first CRI SEI message.

7. An apparatus comprising:
means for receiving a bitstream including encoded video data, a first colour remapping information (CRI) supplemental enhancement information (SEI) message including a first colour remapping identification value (colour_remap_id), and a second CRI SEI message including a second colour remapping identification value (colour_remap_id), wherein the first CRI SEI message and the second CRI SEI message are associated with the same picture of the encoded video data, wherein the first CRI SEI message includes information corresponding to a first one or more colour remapping processes, and wherein the second CRI SEI message includes information corresponding to a second one or more colour remapping processes different from the first one or more colour remapping processes;
means for determining, based on the first identification value (colour_remap_id) and the second identification value (colour_remap_id), an order in which to apply, on the same picture of the encoded video data, the first one or more colour remapping processes corresponding to the information included in the first CRI SEI message and the second one or more colour remapping processes corresponding to the information included in the second CRI SEI message;
means for decoding the encoded video data to generate decoded video data;
means for applying, prior to application of any colour remapping process of the first or second one or more colour remapping processes, an upsampling process to the decoded video data to produce processed decoded video data; and
means for applying, to the processed decoded video data, after applying the upsampling process to the decoded video data, at least one colour remapping process of the first one or more colour remapping processes corresponding to the information included in the first CRI SEI message and at least one colour remapping process of the second one or more colour remapping processes corresponding to the information included in the second CRI SEI message in the determined order.

8. The apparatus of claim 7, wherein the first CRI SEI message does not include information corresponding to any of: (i) the upsampling process, (ii) a downsampling process, (iii) a colour space conversion process, (iv) an inverse quantization process, and (v) a change of colour primaries used to represent components of the decoded video data.

9. The apparatus of claim 7, further comprising:
means for receiving, as part of the first CRI SEI message, a value corresponding to a syntax element indicative of:
whether the processed decoded video data is compatible for presentment by a Standard Dynamic Range (SDR) display or a High Dynamic Range (HDR) display,
whether the first one or more colour remapping processes corresponding to the information included in the first CRI SEI message are configured such that an input and an output respectively corresponding to each colour remapping process of the first one or more colour remapping processes are equal, or
whether the at least one of: (i) the upsampling process, (ii) a downsampling process, (iii) a colour space conversion process, (iv) an inverse quantization process, or (v) a change of colour primaries used to represent components of the decoded video data is to be applied between applications of two colour remapping processes of the first one or more colour remapping processes corresponding to the information included in the first CRI SEI message.

10. A non-transitory computer-readable storage medium encoded with instructions that, when executed, cause one or more processors of a device to:
receive a bitstream including encoded video data, a first colour remapping information (CRI) supplemental enhancement information (SEI) message including a first colour remapping identification value (colour_remap_id), and a second CRI SEI message including a second colour remapping identification value (colour_remap_id), wherein the first CRI SEI message and the second CRI SEI message are associated with the same picture of the encoded video data, wherein the first CRI SEI message includes information corresponding to a first one or more colour remapping processes, and wherein the second CRI SEI message includes information corresponding to a second one or more colour remapping processes different from the first one or more colour remapping processes;
determine, based on the first identification value (colour_remap_id) and the second identification value (colour_remap_id), an order in which to apply, on the same picture of the encoded video data, the first one or more colour remapping processes corresponding to the information included in the first CRI SEI message and the second one or more colour remapping processes corresponding to the information included in the second CRI SEI message;
decode the encoded video data to generate decoded video data;
apply, prior to applying any colour remapping process of the first or second one or more colour remapping processes, an upsampling process to the decoded video data to produce processed decoded video data; and
apply, to the processed decoded video data, after applying the upsampling process to the decoded video data, at least one colour remapping process of the first one or more colour remapping processes corresponding to the information included in the first CRI SEI message and at least one colour remapping process of the second one or more colour remapping processes corresponding to the information included in the second CRI SEI message in the determined order.

11. The non-transitory computer-readable storage medium of claim 10, wherein the first CRI SEI message does not include information corresponding to any of: (i) the upsampling process, (ii) a downsampling process, (iii) a colour space conversion process, (iv) an inverse quantization process, and (v) a change of colour primaries used to represent components of the decoded video data.

12. The non-transitory computer-readable storage medium of claim 10, further encoded with instructions that, when executed, cause the one or more processors to:
receive, as part of the first CRI SEI message, a value corresponding to a syntax element indicative of:
whether the processed decoded video data is compatible for presentment by a Standard Dynamic Range (SDR) display or a High Dynamic Range (HDR) display,
whether the first one or more colour remapping processes corresponding to the information included in the first CRI SEI message are configured such that an input and an output respectively corresponding to each respective colour remapping process of the first one or more colour remapping processes are equal, or whether the at least one of: (i) the upsampling process, (ii) a downsampling process, (iii) a colour space conversion process, (iv) an inverse quantization process, or (v) a change of colour primaries used to represent components of the decoded video data is to be applied between applications of two colour remapping processes of the first one or more colour remapping processes corresponding to the information included in the first CRI SEI message.

* * * * *